US009127713B1

(12) United States Patent
Lu

(10) Patent No.: US 9,127,713 B1
(45) Date of Patent: Sep. 8, 2015

(54) BEARING ASSEMBLIES

(71) Applicant: US Synthetic Corporation, Orem, UT (US)

(72) Inventor: Xiaobin Lu, Orem, UT (US)

(73) Assignee: US SYNTHETIC CORPORATION, Orem, UT (US)

( * ) Notice: Subject to any disclaimer, the term of this patent is extended or adjusted under 35 U.S.C. 154(b) by 0 days.

(21) Appl. No.: 14/489,027

(22) Filed: Sep. 17, 2014

(51) Int. Cl.
F16C 17/04 (2006.01)
F16C 33/04 (2006.01)
F16C 17/02 (2006.01)

(52) U.S. Cl.
CPC ............... *F16C 33/043* (2013.01); *F16C 17/02* (2013.01); *F16C 17/04* (2013.01)

(58) Field of Classification Search
USPC ............. 384/95, 97, 117, 122, 302, 303, 306, 384/308, 309, 312
See application file for complete search history.

(56) References Cited

U.S. PATENT DOCUMENTS 3,565,498 A * 2/1971 Leopard et al. ............... 384/303
4,410,054 A 10/1983 Nagel et al.
4,560,014 A 12/1985 Geczy
5,364,192 A 11/1994 Damm et al.
5,368,398 A 11/1994 Damm et al.
5,480,233 A 1/1996 Cunningham
5,503,479 A * 4/1996 Ide ................................. 384/122
5,549,392 A * 8/1996 Anderson ...................... 384/117
6,460,635 B1 10/2002 Kalsi et al.
7,842,111 B1 11/2010 Sani
7,866,418 B2 1/2011 Bertagnolli et al.
7,901,137 B1 * 3/2011 Peterson .......................... 384/92
8,236,074 B1 8/2012 Bertagnolli et al.
8,496,075 B2 7/2013 Scott et al.
2006/0171616 A1 8/2006 Richie et al.

FOREIGN PATENT DOCUMENTS

WO   WO 02/35051     5/2002
WO   WO 2006/083756  8/2006

* cited by examiner

*Primary Examiner* — Phillip A Johnson
(74) *Attorney, Agent, or Firm* — Dorsey & Whitney LLP

(57) ABSTRACT

Embodiments of the invention relate a bearing assembly, which may be operated at least partially hydrodynamically, and includes a support ring having reduced-thickness portions configured to elastically flex for promoting hydrodynamic fluid flow between opposing bearings of the bearing apparatus incorporated in a bearing apparatus. The disclosed bearing assemblies and apparatuses may be employed in downhole motors of a subterranean drilling system or other mechanical systems.

20 Claims, 16 Drawing Sheets

BEARING ASSEMBLIES

BACKGROUND

Bearing apparatuses exhibit a number of configurations including ball bearings, roller bearings, thrust bearings, radial bearings, journal bearings, and roller bearings. Depending on the application, the bearing apparatus may operate as a plain bearing, a roller bearing, a fluid bearing, or other any other mode of operation of a bearing.

Bearing apparatuses have found particular use as radial, thrust, and journal bearings. Each bearing apparatus may include a stator that does not rotate and a rotor that is attached to an output shaft and rotates with the output shaft. The stator and rotor may each include one or more bearing elements or inserts thereon. Each bearing element may be fabricated to provide an upper bearing surface that bears against other bearing surfaces during use.

In a conventional polycrystalline diamond compact ("PDC") bearing apparatus, a bearing assembly may include a support ring that may be configured to accept a number of superhard bearing elements. The superhard bearing elements may be made from a polycrystalline diamond ("PCD") layer formed on a cemented tungsten carbide substrate that forms a PDC.

Despite the availability of a number of different bearing assembly designs, manufacturers and users of bearing apparatuses continue to seek improved bearing apparatus designs and manufacturing techniques.

SUMMARY

Embodiments of the invention relate a bearing assembly, which may be operated at least partially hydrodynamically, and includes a support ring having reduced-thickness portions configured to elastically deflect for promoting hydrodynamic fluid film formation between opposing bearings of the bearing assembly incorporated in a bearing apparatus. The disclosed bearing assemblies and apparatuses may be employed in downhole motors of a subterranean drilling system or other mechanical systems.

In an embodiment, a bearing assembly includes a plurality of superhard bearing elements distributed circumferentially about an axis. Each of the plurality of superhard bearing elements includes a leading side and a trailing side. The bearing assembly further includes a support ring having the plurality of superhard bearing elements mounted thereto. The support ring including a first surface, a second surface spaced from the first surface, and a plurality of reduced-thickness portions. Each of the reduced-thickness portions exhibits a reduced-thickness dimension relative and is defined between the first and second surfaces of the support ring. Each of the plurality of reduced-thickness portions may be selectively located proximate to the leading side of a respective one of the plurality of superhard bearing elements.

In an embodiment, a bearing apparatus includes two opposing bearing assemblies, one of which may be configured as a rotor and the other as a stator. At least one of the rotor or stator may be configured as any of the embodiments of bearing assemblies disclosed herein.

Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

The drawings illustrate several embodiments of the invention, wherein identical reference numerals refer to identical or similar elements or features in different views or embodiments shown in the drawings.

DETAILED DESCRIPTION

Embodiments of the invention relate a bearing assembly, which may be operated at least partially hydrodynamically, and includes a support ring having reduced-thickness portions configured to elastically deflect for promoting hydrodynamic fluid film formation between opposing bearings of the bearing assembly incorporated in a bearing apparatus. The disclosed bearing assemblies and apparatuses may be employed in downhole motors of a subterranean drilling system or other mechanical systems.

While the description herein provides examples relative to a subterranean drilling and a motor assembly, the bearing assembly and apparatus embodiments disclosed herein may be used in any number of applications. For instance, the bearing assemblies and apparatuses may be used in pumps, motors, compressors, turbines, generators, gearboxes, and other systems and apparatuses, or in any combination of the foregoing. Furthermore, while the embodiments disclosed herein are described as being operated hydrodynamically, the bearing assemblies and apparatuses may also be operated partially hydrodynamically or not hydrodynamically, if desired or needed, without limitation.

Figure 1A:
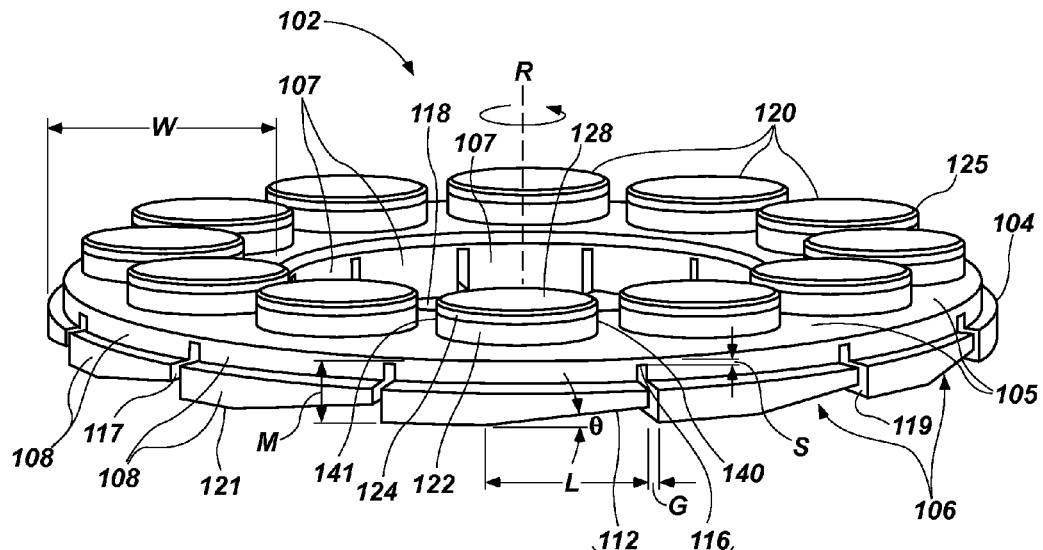
FIG. 1A is an isometric view of a thrust-bearing assembly according to an embodiment.

FIG. 1A is an isometric view of a thrust-bearing assembly 102 according to an embodiment. The thrust-bearing assembly 102 may form a stator or a rotor of a thrust-bearing apparatus. The thrust-bearing assembly 102 includes a support ring 104 that carries a plurality of superhard bearing elements 120 circumferentially spaced about a thrust/rotation axis "R." The support ring 104 may exhibit a nominal thickness "M" and a plurality of (or one or more) reduced-thickness portions 110 (i.e., portions of the support ring 104 exhibiting a reduced thickness relative to adjacent portions of the support ring 104 and/or the nominal thickness M of the support ring 104) at a lower surface thereof sufficient to allow deformation (e.g., temporary elastic deflection or bending) of the support ring 104 to create hydrodynamic fluid film formation or adjust hydrodynamic flow between the plurality of superhard bearing elements 120 and an opposing surface (e.g., opposing superhard bearing elements, journal, or shaft) when fluid forces a leading side of a superhard bearing element 120 to deflect away from an opposing surface or superhard bearing element 120. Each of the plurality of reduced-thickness portions 110 is selectively positioned proximate to a leading side of at least one of the plurality of superhard bearing elements 120, with the leading side determined by the direction of rotation of the support ring 104. The plurality of reduced-thickness portions 110 may include a recessed surface 112 (e.g., sloped or angled surface) and/or a gap 116.

The support ring 104 may include an upper surface 105 and a lower surface 106 spaced from each other by a radial (e.g., lateral) surface defining the thickness of the support ring 104. The upper surface 105 may be substantially planar except for the superhard bearing elements 120 attached (e.g., mounted or affixed) thereto or any bearing recesses formed therein. The lower surface 106 may partially define the plurality of reduced-thickness portions 110. For example, the reduced-thickness portion 110 may include a portion of the support ring 104 exhibiting the reduced-thickness dimension between the upper surface 105 and the lower surface 106 of the support ring 104 in relation to an adjacent portion of the support ring 104 and/or to the thickness M of the support ring 104. The reduced-thickness dimension may be formed by removing (e.g., by machining) a portion of material from the support ring 104 or forming the support ring 104 to near net shape such as by powder metallurgy or casting.

The support ring 104 may be made from a variety of different materials. For example, the support ring 104 may comprise carbon steel, stainless steel, tungsten carbide, or another suitable material. Although described as upper and lower surfaces herein, the terms upper and lower surfaces are merely used for differentiation between a surface of the support ring having superhard bearing elements bonded thereto or therein—the upper surface—and a surface separated therefrom—the lower surface.

Figure 1B:
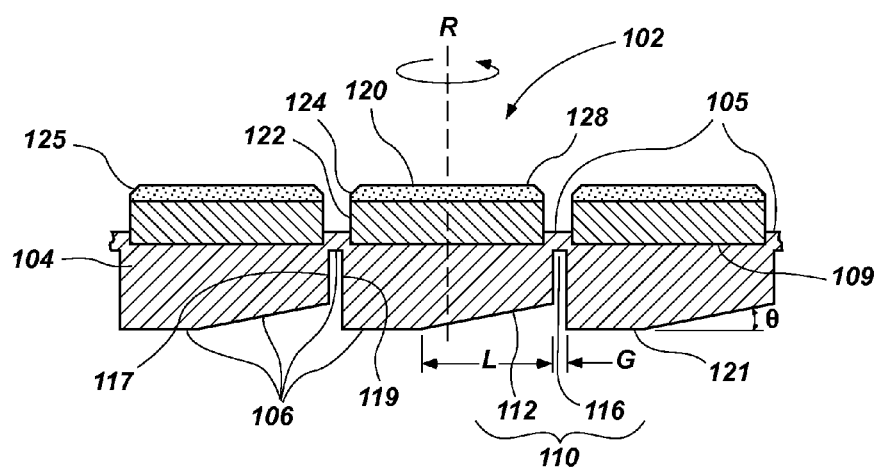
FIG. 1B is a partial, cross-sectional side view of the thrust-bearing assembly of FIG. 1A.

As shown in FIGS. 1A and 1B, the support ring 104 may carry the plurality of superhard bearing elements 120 thereon. Each or at least some of the plurality of superhard bearing elements 120 may include a substrate 122 and a bearing body 124 bonded to the substrate 122, with the bearing body 124 including an optional chamfer 125. Optionally, at least some of the plurality of superhard bearing elements 120 may not include the substrate 122 and may only include the bearing body 124, such as the bearing body 124 bonded directly to or mechanically attached to the support ring 104. Examples of bearing assemblies having thermally-stable polycrystalline diamond bearing elements secured with a support ring by use of a retention ring are disclosed in U.S. Pat. No. 8,496,075, the disclosure of which is incorporated herein, in its entirety, by this reference.

Each of the plurality of superhard bearing elements 120 may include a leading side 140, a trailing side 141, and a bearing surface 128 (i.e., upper working surface) therebetween. The leading side 140 and trailing side 141 may be determined from the relative rotation of the support ring 104. In some embodiments, each of the bearing surfaces 128 may be substantially planar and substantially coplanar with each other. In some embodiments, a fluid used to cool and/or lubricate the superhard bearing elements 120 rotating in a direction R may encounter the leading side 140 first and the trailing side 141 second. The fluid may be forced or allowed in between the bearing surface 128 and an opposing bearing surface by deformation (e.g., a temporary deflection or bending) of the support ring 104 proximate to the leading side 140 due to the increased compliance/flexibility of the reduced-thickness portion 110. Each of the plurality of superhard bearing elements disclosed herein may be circumferentially spaced from each other a selected distance to allow deformation (e.g., deflection or bending) of the support ring 104 between adjacent superhard bearing elements 120 to thereby allow more fluid and/or a fluid film to develop between the superhard bearing elements 120 and the opposing superhard bearing elements or surface, resulting in greater hydrodynamic force between opposing superhard bearing elements and the ability to respond to varying or fluctuating thrust loads during operation. Such spacing between the plurality of superhard bearing elements 120 may be about 250 μm or greater, such as about 1 mm to about 2 cm, or about 2 mm to about 1 cm.

In any of the embodiments disclosed herein, at least one, at least some, or each of the plurality of superhard bearing elements (e.g., the superhard bearing elements 120) may be made from one or more superhard materials, such as polycrystalline diamond, polycrystalline cubic boron nitride, silicon carbide, tungsten carbide, or any combination of the foregoing superhard materials. As used herein a "superhard material" is a material exhibiting a hardness that is greater tungsten carbide and a "superhard bearing element" includes a superhard material therein. For example, the superhard bearing element may include a body or table formed from polycrystalline diamond and the substrate may be formed from cobalt-cemented tungsten carbide. Furthermore, in any of the embodiments disclosed herein, the polycrystalline diamond body or table may be leached to at least partially or substantially completely remove a metal-solvent catalyst (e.g., cobalt, iron, nickel, or alloys thereof) that was used to initially sinter precursor diamond particles that form the polycrystalline diamond. In another embodiment, an infiltrant used to re-infiltrate a preformed leached polycrystalline diamond table may be leached or otherwise removed to a selected depth from a bearing surface inward. Moreover, in any of the embodiments disclosed herein, the polycrystalline diamond may be unleached and include a metal-solvent catalyst (e.g., cobalt, iron, nickel, or alloys thereof) that was used to initially sinter the precursor diamond particles that form the polycrystalline diamond or an infiltrant used to re-infiltrate a preformed leached polycrystalline diamond table. Other examples of methods for fabricating the superhard bearing elements are disclosed in U.S. Pat. Nos. 7,866,418, 7,842,111, 8,236,074, the disclosure of each of which is incorporated herein, in its entirety, by this reference.

The diamond particles that may form the polycrystalline diamond in the bearing body 126 may also exhibit a larger average particle size and at least one relatively smaller average particle size (i.e., a bimodal diamond powder). According to various embodiments, the diamond particles may include a portion exhibiting a relatively larger size of about 8 μm and larger (e.g., 30 μm, 20 μm, 15 μm, 12 μm, 10 μm, 8 μm) and another portion exhibiting at least one relatively smaller size of about 6 μm and smaller (e.g., 6 μm, 5 μm, 4 μm, 3 μm, 2 μm, 1 μm, 0.5 μm, less than 0.5 μm, 0.1 μm, less than 0.1 μm). In an embodiment, the diamond particles may include a portion exhibiting a relatively larger size between about 10 μm and about 40 μm and another portion exhibiting a relatively smaller size between about 1 μm and 4 μm. In some embodiments, the diamond particles may comprise three or more (i.e., trimodal or greater diamond powders) different average particle sizes (e.g., one relatively larger size and two or more relatively smaller sizes, or vice versa), without limitation.

Additionally, as discussed in more detail below, in any of the embodiments disclosed herein, the superhard bearing elements 120 may be free-standing (e.g., substrateless) and formed from a polycrystalline diamond body that is at least partially or fully leached to remove a metal-solvent catalyst initially used to sinter the polycrystalline diamond body.

The support ring 104 may exhibit the thickness M (e.g., a greater thickness or even maximum thickness) and at least one (e.g., one or more, or a plurality of) portion having a smaller thickness S (e.g., a reduced thickness or even a minimum thickness). The reduced-thickness portion 110 may allow the support ring 104 and the superhard bearing element 120 thereon to deflect or bend away from an opposing superhard bearing element or surface when fluid is encountered by the leading side 140 to thereby allow more fluid between the superhard bearing element 120 and the opposing superhard bearing element or surface, resulting in greater hydrodynamic force/behavior between opposing superhard bearing elements and the ability to respond to varying or fluctuating thrust loads.

Each of the plurality of reduced-thickness portions 110 includes a discrete portion or region of the lower surface 106 of the support ring 104 exhibiting some thickness less than the thickness M (e.g., greater thickness or maximum thickness). Each of the plurality of reduced-thickness portions 110 may be selectively located proximate to corresponding leading sides 140 of the plurality of superhard bearing elements 120. Put another way, each of the plurality of reduced-thickness portions 110 may exhibit the thickness S (e.g., reduced thickness or minimum thickness) at a point circumferentially between two adjacent bearing elements 120 of the plurality of superhard bearing elements 120. In the illustrated embodiment, the reduced-thickness portion 110 may include a recessed surface 112 and/or at least one gap 116. The recessed surface 112 may extend along a portion of the circumferential length L of the lower surface 106 of the support ring 104, with the thickness S selectively located proximate to the leading side 140 of one of the plurality of superhard bearing elements 120. The recessed surface 112 may extend to the thickness M at a location nearer the trailing side 141 of the same one of the plurality of superhard bearing elements 120. The recessed surface 112 of the reduced-thickness portion 110 may terminate at the thickness M (e.g., maximum thickness) of the support ring 104, which may extend for a portion of the length L, thereby forming a support surface 121 (e.g., a land or flat portion of the lower surface) exhibiting the thickness M between adjacent reduced-thickness portions 110. The recessed surface 112 may be at least partially non-planar, at least partially planar, or combinations of planar and non-planar, without limitation. The circumferential length L of the recessed surface 112 may be same as, less than, or greater than the overall lateral dimension (e.g., diameter, width, or length as measured with respect to the circumference of the support ring 104) of the corresponding superhard bearing element 120 proximate to the recessed surface 112, such that the recessed surface 112 (e.g., sloped surface) allows the reduced-thickness portion 110 and the superhard bearing element 120 thereon to deflect away from an opposing bearing surface when the leading side 140 encounters the fluid, thereby creating and/or enhancing hydrodynamic lift between opposing superhard bearing elements. For example, the circumferential length L of the recessed surface 112 may be equal to or greater than the greatest lateral dimension (e.g., diameter, width, or length) of the corresponding superhard bearing element 120 proximate to the recessed surface 112, such as about 40% or more, about 40% to about 120%, about 50% to about 110%, about 60% to about 100%, about 75% to about 90%, about 80% to about 100%, about 90% to about 110%, about 50%, about 90%, or about 100% of the greatest lateral dimension (e.g., diameter, width, or length) of the corresponding superhard bearing element proximate to the recessed surface 112. In such embodiments, the remainder or portions of the remainder of the lower surface 106 of the support ring 104 may be substantially parallel to the upper surface 105 of the support ring 104 or the superhard bearing element 120 and may exhibit the nominal thickness M, thereby forming a land or flat portion of the lower surface 106. In some embodiments, the circumferential length L of the recessed surface 112 may be between about 50% and less than 100% of the greatest lateral dimension of the corresponding superhard bearing element 120 proximate to the recessed surface 112. In such embodiments, the recessed surface 112 may exhibit a portion having the thickness S proximate to the leading side 140 and increase in thickness to a point closer to the trailing side 141, with the thickness again decreasing as it approaches the trailing side 141 to thereby allowing the support ring 104 to deflect the one of the plurality of superhard bearing elements 120 away from an opposing superhard bearing elements regardless of the direction of rotation. Put another way, the lower surface 106 of the support ring 104 may include reduced-thickness portions at both the leading side and the trailing side to allow or improve hydrodynamic flow between superhard bearing elements 120 no matter the direction of rotation of the support ring 104 (e.g., a double tapered reduced-thickness portion or portions).

The recessed surface 112 may form an angle θ (e.g., a constant angle defining a planar surface) with respect to the bearing surface 128 of a corresponding individual one of the superhard bearing elements 120. The angle θ may be more than zero degrees, such as an angle greater than zero degrees to about 70 degrees or less, about 1 degree to about 60 degrees, about 5 degrees to about 45 degrees, about 15 degrees to about 30 degrees, about 30 degrees to about 60 degrees, about 5 degrees to about 45 degrees, about 10 degrees, about 20 degrees, about 30 degrees, about 45 degrees, about 60 degrees, or about 70 degrees. In some embodiments, the recessed surface 112 may have a changing angle θ across at least a portion of the circumferential length L of the recessed surface 112, thereby at least partially defining the reduced-thickness portion 110 exhibiting an increasing or decreasing in slope (e.g., a non-planar surface) along its circumferential length L. In some embodiments, the angle θ may increase along the circumferential length L from the leading side to the trailing side, resulting in a concave recessed surface 112. In some embodiments, the angle θ may decrease along the circumferential length L from the leading side to the trailing side, resulting in a convex recessed surface 112. In some embodiments, convex or concave recessed surfaces may begin or terminate on any angle θ described above.

As previously discussed, in some embodiments, the reduced-thickness portion 110 may include the gap 116. The gap 116 may exhibit a gap width or distance G extending between a gap wall surface 117 and a second gap wall surface 119. The support ring 104 may exhibit a reduced-thickness in the gap 116 that is smaller than any thickness along the recessed surface 112 (e.g., the thickness S). The gap 116 may exhibit a gap width or distance G less than, equal to, or greater than the distance between adjacent superhard bearing elements 120. The gap 116 may have a gap width or distance G of about 0.01 inches or more, such as about 0.01 inches to about 1 inch, about 0.05 inches to about 0.750 inches, about 0.10 inches to about 0.50 inches, about 0.01 inches to about 0.40 inches, about 0.20 inches to about 0.25 inches, about 0.10 inches to about 0.50 inches, about 0.020 inches, about 0.1 inches, or about 0.25 inches. The gap width or distance G may be about 10% or more of the distance between adjacent superhard bearing elements 120, such as about 10% to about 200%, about 25% to about 175%, about 50% to about 150%, about 75% to about 125%, about 90% to about 110%, about 110% to about 200%, about 10% to about 90%, about 100%, about 50%, or about 150% the distance between adjacent superhard bearing elements 120. The gap width or distance G may be selected based on any of a number of factors including, the desired amount of flex in the support ring 104, the desired tilt of the bearing elements during use, the diameter of the support ring 104, a radial width W of the support ring 104, the size (e.g., diameter, length, and/or width) of the superhard bearing elements 120 in relation to the support ring 104, the distance between the bearing bodies 120, the thickness S of the support ring 104, or combinations of any of the foregoing. The thickness S of the support ring 104 may be configured to allow for temporary elastic deformation of the support ring in order to create or adjust hydrodynamic fluid flow (e.g., by allowing tilt and/or rotation of one or more bearing elements) between opposing superhard bearing elements and a return to the original shape of the support ring. In some embodiments, the thickness S (e.g., minimum thickness), as found in the gap 106 or the thickness of the recessed surface 112, may be a proportion of the thickness M (e.g., maximum thickness) of the support ring 104, such as about 10% of the thickness M of the support ring 104, such as about 10% to about 95%, about 20% to less than 100%, about 30% to about 90%, about 40% to about 80%, about 50% to about 75%, about 25%, about 50%, about 75% or about 90% of the thickness M of the support ring 104.

In some embodiments, the gap 116 may be at least partially defined by substantially parallel gap wall surfaces 117 and 119. The gap wall surfaces 117 and 119 may be positioned at or near the leading side of the recessed surface 112 and the trailing side of an adjacent support surface 121, and may extend radially through the width W of the support ring 104. The gap wall surfaces 117 and 119 may be substantially perpendicular to the upper surface 105 of the support ring 104, or may be formed at an angle with respect to the upper surface 105 of the support ring 104 and may be separated by a uniform or non-uniform gap width G substantially similar to any described herein. The gaps 116 may be positioned generally circumferentially between adjacent superhard bearing elements 120 or may be positioned such that a portion of the gap 116 is below (e.g., directly below) a portion of one or both proximate superhard bearing elements 120.

Figure 1C:
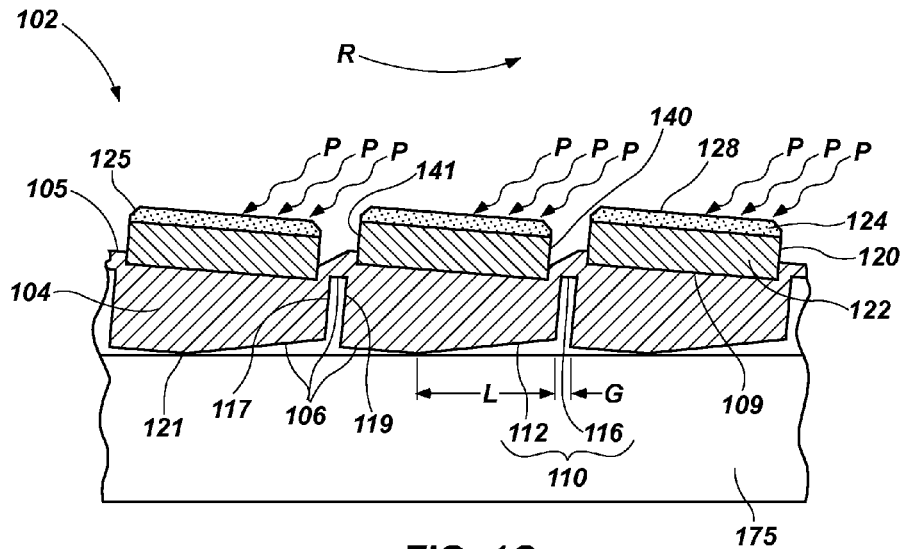
FIG. 1C is an exaggerated, partial, cross-sectional side view of the thrust-bearing assembly of FIG. 1A during use.

FIG. 1C depicts an exaggerated, partial, cross-sectional view of the bearing assembly of FIGS. 1A and 1B during use (e.g., while deflection of the bearing surface 128 is taking place). As the leading side 140 of one of the bearing elements 120 encounters an oncoming fluid (e.g., a lubricating fluid), the pressure P of the fluid between the bearing surface 128 and an opposing surface exerts a force on the bearing surface 128 away from the opposing bearing surface (e.g., opposing bearing element). The pressure P exerted on the bearing surface 128 at the leading side 140 may cause the bearing surface 120 and proximate portion of the support ring 104 to deflect away responsive to the pressure. The reduced-thickness portion 110 may provide an empty space for the support ring to deflect into between the lower surface of the support ring 104 and the support 175 on which the support ring 104 rests. The amount of displacement/deflection depicted in FIG. 1C is exaggerated to illustrate displacement during use. In some embodiments, the support surface 121 may remain substantially or completely in contact with support 175 during use. The distance of displacement/deflection may vary based on the size of the support ring, size of the bearing elements, thickness of the support ring (both in an out of the reduced thickness portion), amount of pressure exerted by the fluid, and other characteristics of the bearing apparatus without limitation. In an embodiment, the leading side 140 of one of the bearing surfaces 128 of the bearing element 120 may deflect 0.00001 inches or more away from an opposing bearing surface during use, such as about 0.00001 inches to about 0.003 inches, about 0.00002 inches to about 0.002 inches, about 0.00005 inches to about 0.001 inches, about 0.00045 inches, about 0.0007 inches about 0.001 inches, or about 0.002 inches.

Figure 1D:
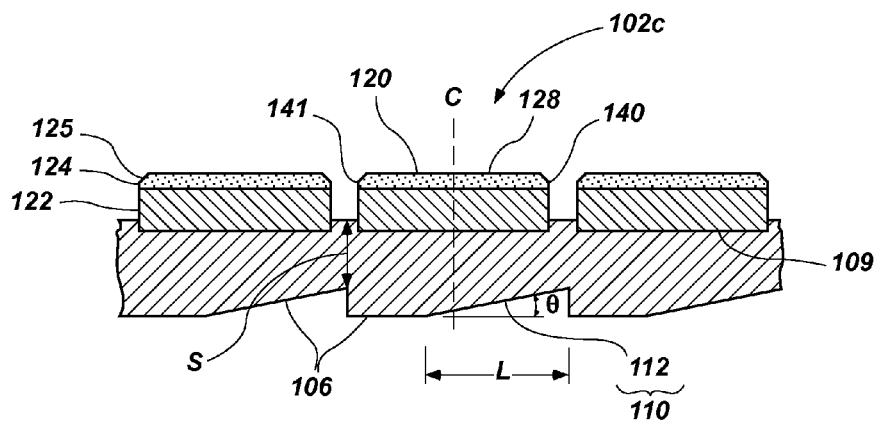
FIG. 1D is a partial, cross-sectional side view of a thrust-bearing assembly according to an embodiment.

As shown in FIG. 1D, in some embodiments, the reduced-thickness portion 110 may be formed solely by the recessed surface 112. In such embodiments, the recessed surfaces 112 may be distinct from one another as shown in FIG. 1D.

Referring again to FIG. 1A, in some embodiments, the support ring 104 may have a radial width W. In one embodiment, the radial width W may be sufficient to allow for a single superhard bearing element 120 to fit within the width of the support ring 104 (e.g., to provide an excess of width relative to the width of the superhard bearing element 120). In one embodiment, the radial width W may be sufficient to allow for more than one row of superhard bearing elements 120 thereon. For example, the radial width W may allow for 2 or more rows (e.g., staggered or radially spaced from one another) of superhard bearing elements 120. In some embodiments, the plurality of reduced-thickness portions 110 may extend radially across the entire width of the support ring 104. The reduced-thickness portion 110 (e.g., the recessed surface and/or gaps) may exhibit substantially consistent geometry or varying geometry across the width W of the support ring 104. For example, the angle θ may be the same at the inner radial surface and the outer radial surface, or the gap width G may have the same circumferential length L across the entire width of the support ring. In some embodiments, the reduced-thickness portion 110 (e.g., a recessed surface and/or gaps) may exhibit substantially non-uniform or varying geometry across the width W of the support ring 104, without limitation. For example, the reduced-thickness portion 110 may have a greater angle θ near the outer radial surface than near the inner radial surface or vice versa; may have a greater thickness S (e.g., reduced thickness) near the outer surface than near the inner radial surface or vice-versa; may have a proportionally larger gap width G near the inner surface than near the outer radial surface or vice versa; or combinations of any of the foregoing.

In some embodiments, the reduced-thickness portion 110 may exclude the recessed surface 112. Put another way, the reduced-thickness portion 110 may solely comprise a gap 116 or a plurality of gaps 116 (e.g., forming a stepped lower surface of the support ring 104). In such embodiments, the gap 116 or plurality of gaps may be positioned proximate to the leading side 140 of a corresponding superhard bearing element 120, and may extend along the circumferential length L of the support ring sufficient to allow the support ring to flex when the leading side 140 of a superhard bearing element 120 deflects during use (e.g., from hydrodynamic fluid during film development between the opposing superhard bearing elements). For example, the gap width or distance G or sum of gap widths G may extend laterally a circumferential length L of about half or more of the greatest lateral dimension of the corresponding superhard bearing element 120.

Figure 1E:
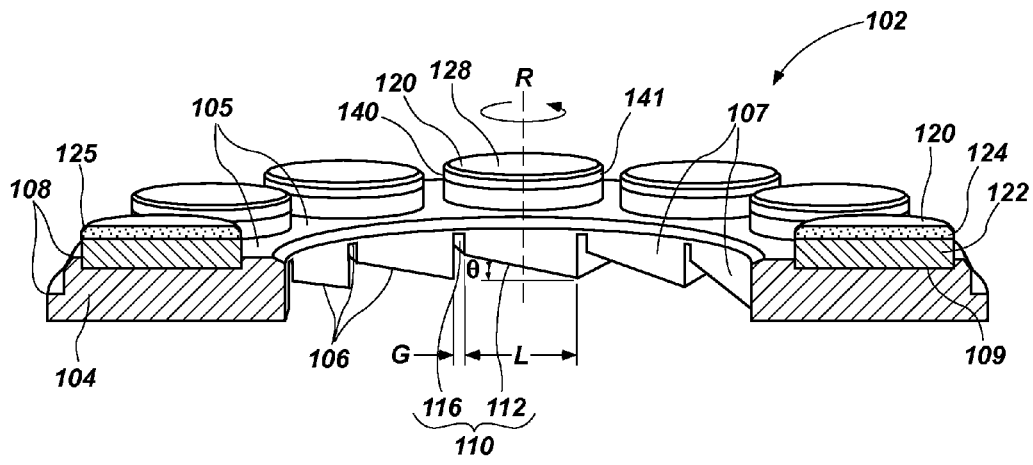
FIG. 1E is an isometric cutaway view of the thrust-bearing assembly of FIG. 1A.

In some embodiments, the support ring 104 may include a common channel formed in the upper surface 105 in which the superhard bearing elements 120 may be placed or affixed to the support ring 104. In other embodiments, such as that shown in FIG. 1E, the support ring 104 may define multiple pockets or recesses 109 into which the superhard bearing elements 120 may be placed or affixed. In some embodiments, the upper surface 105 of the support ring 104 may be substantially planar thereacross (i.e., having no pockets or channels therein), and the plurality of superhard bearing elements 120 may be attached or otherwise mounted thereto. The superhard bearing elements 120 may then be supported or secured to or within the support ring 104 in any suitable manner. At least a portion of or all of the superhard bearing elements 120 may be partially secured at least partially in the recesses 109 via brazing, welding, soldering, press-fitting, fastening with a fastener, or another suitable technique. The support ring 104 may also include an inner radial surface 107 defining an aperture 118. The aperture 118 may be generally centered about the thrust/rotation axis R, and may be adapted to receive a shaft (e.g., a downhole drilling motor shaft).

Figure 1F:
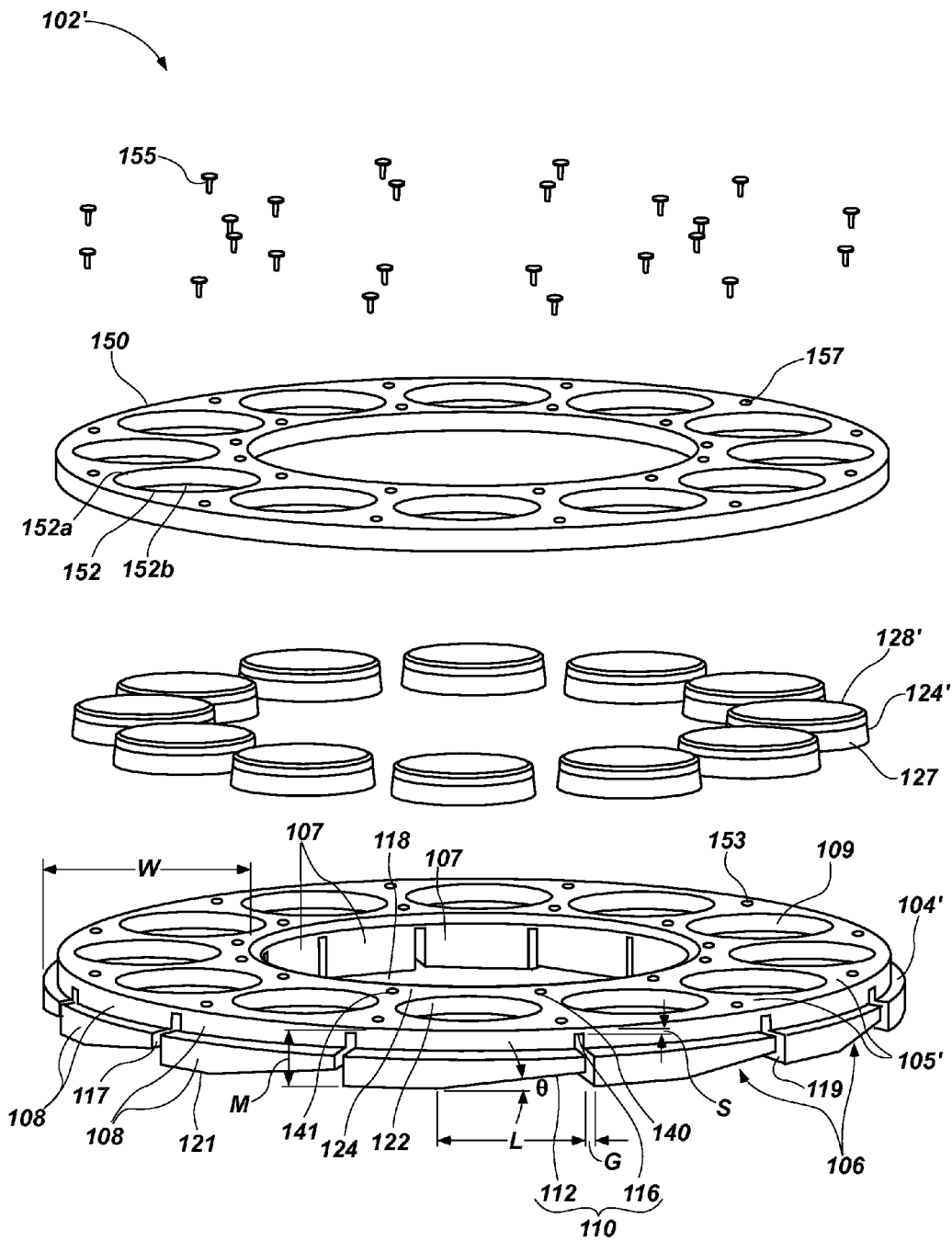
FIG. 1F is an exploded isometric view of the thrust-bearing assembly of according to an embodiment.

FIG. 1F illustrates a bearing assembly 102' including a plurality of freestanding superhard bearing bodies 124' (e.g., a polycrystalline diamond body without a substrate) which may be secured thereto by a retention ring 150 and fasteners 155. Any suitable superhard bearing element may be secured to the support ring 104' by the retention ring 150 and fasteners 155, in a similar or identical manner as shown in U.S. Pat. No. 8,496,075. The support ring 104' may be substantially similar to any support ring 104, 204, or 304 described herein, including some or all if the features associated therewith. The support ring 104' may have a plurality of recessed 109 formed therein. The recesses 109 may be sized and configured to allow a superhard bearing element 120' to fit therein. Each of the plurality of freestanding superhard bearing bodies 124' may have an upper surface 128', a lower surface 127 and a lateral surface therebetween. In some embodiments, the plurality of freestanding superhard bearing bodies 124' may be generally cylindrical, frustoconical, cuboid, combinations of the foregoing, or exhibit any other suitable shape without limitation. The freestanding superhard bearing bodies 124' shown in FIG. 1F exhibit a frustoconical configuration wherein the upper surface 128' is smaller than the lower surface 127. When positioned on the support ring (e.g., in one of the recesses 109 or on the upper surface 105), the bearing bodies may be secured in place by the retention ring 150. The retention ring 150 may be placed over and/or around the free standing superhard bearing bodies 124' and be affixed to the support ring 104' by fasteners 155 (e.g., bolts, screws, rivets, or any other suitable fastener, without limitation). The fasteners 155 may be aligned and inserted through the holes 157 in the retention ring 150 and into the receiving holes 153 located in the support ring. In an embodiment, the receiving holes 153 may be threaded and the fasteners 155 may be bolts having a complementary thread inserted therein. The fasteners 155 may be secured to the support ring (e.g., tightened into the receiving holes 153) to hold the retaining ring 150 down with sufficient force to secure the plurality of free standing superhard bearing bodies 124' in place during use of the bearing assembly 102'. The retention ring 150 may be configured to flex and/or otherwise allow deflection of the free standing superhard bearing bodies 124' therein during use. The retention ring 150 may define a pattern (e.g., circumferentially spaced pattern) of bearing body holes 152 configured to allow the free standing superhard bearing bodies 124' to fit partially through the bearing body holes 152 but not pass entirely through. The bearing body holes 152 may include an upper aperture 152a and a lower aperture 152b, wherein the lower aperture 152b is wider than the upper aperture 152a. The circumferentially-spaced pattern may correspond to the recesses 109 in the support ring 104'. The retention ring 150 may also include a plurality of holes 157 spaced about the bearing body holes 152 and correspond to the receiving holes 153 in the support ring 104'.

In an embodiment, a plurality of superhard bearing elements or superhard bearing bodies may be affixed directly to the support ring using any one of an adhesive, brazing, integral formation (e.g., sintering), any other suitable attachment means, or combinations of any of the foregoing. In an embodiment, the support ring 104' may exhibit a substantially flat upper surface 105' (e.g., having no recesses therein). The retention ring 150 may define the spacing for the superhard bearing elements or bodies placed on the upper surface 105'.

Figure 2A:
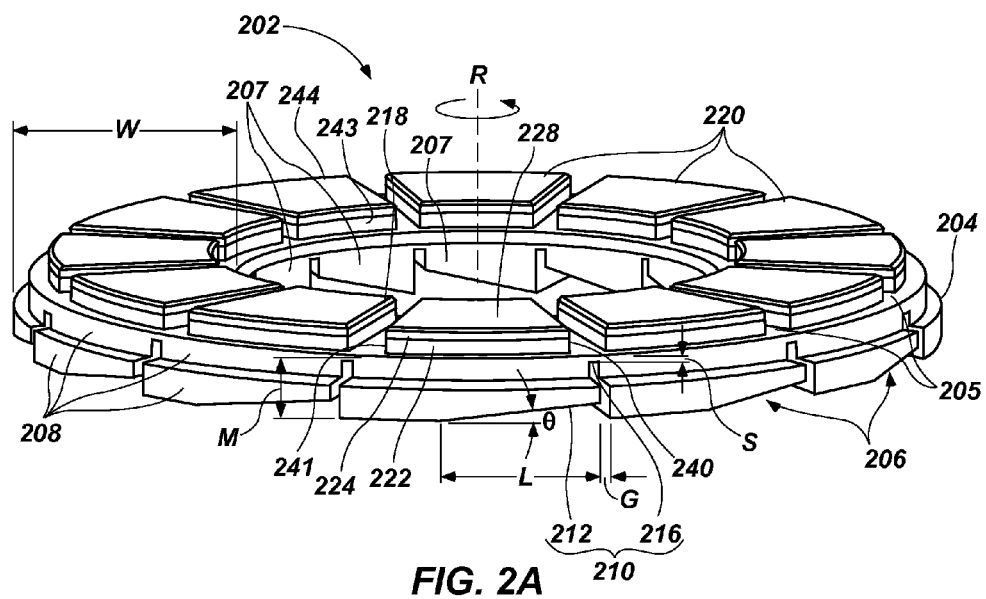
FIG. 2A is an isometric view of a thrust-bearing assembly according to an embodiment.
Figure 2B:
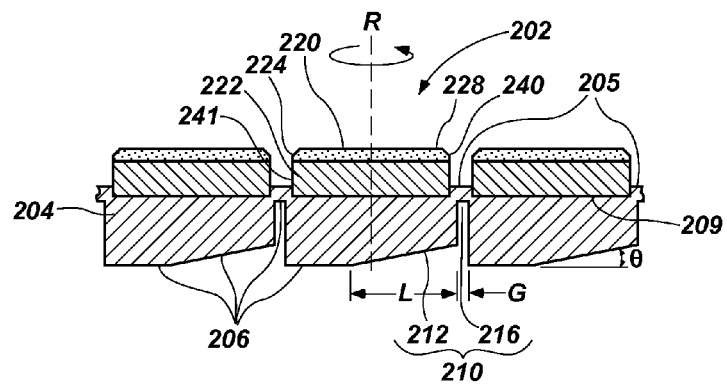
FIG. 2B is a partial, cross-sectional side view of the thrust-bearing assembly of FIG. 2A.

In some embodiments, differing superhard bearing element shapes or constructions (PCD or other) may be used to form any of the bearing assemblies described herein. For example, the thrust-bearing assemblies of FIGS. 1A-1F depict substantially cylindrical superhard bearing elements 120. In other embodiments, the plurality of superhard bearing elements 120 may be non-cylindrical, such as generally cuboid (e.g., a cuboid with rounded corners), pyramidal, a frustum, arbitrary shapes, or combinations of the foregoing. For example, the plurality of superhard bearing elements 220 shown in FIGS. 2A and 2B exhibit a generally trapezoidal bearing surface having a leading side 240, a trailing side 241, a first end 243 proximate to an interior portion of a support ring 204, and a second end 244 proximate to an exterior portion of the support ring 204. The circumferential length L of the first end 243 is smaller than the circumferential length L of the second end 244. Further, reduced-thickness portions 210 may extend radially across the width W of the support ring 204. The support ring 204 includes an upper surface 204, a lower surface 206, and a plurality of superhard bearing elements 220 circumferentially spaced about a thrust/rotation axis. At least one or at least some of the plurality of superhard bearing elements 220 may include a substrate 222 and a bearing body (or table) 226 bonded to the substrate 222. The substrate 222 and the bearing body 226 may be formed according to any process described herein, and may comprise any suitable substrate and bearing body materials described herein. The support ring 204 may include a plurality of recesses 209, into which superhard bearing elements may be at least partially positioned, mounted, and/or affixed. The support ring 204 may further include reduced-thickness portions 210. The reduced-thickness portions 210 may be substantially similar to those described above. For example, as shown in FIGS. 2A and 2B, each or at least some of the reduced-thickness portions 210 may include a recessed surface 212 and a gap 216. The reduced-thickness portions 210 may have a thickness S (e.g., minimum thickness) at the gap 216 and the plurality of recessed surfaces 212 may have a more reduced thickness at a location proximate to the leading side 240 of a corresponding one the plurality of superhard bearing elements 220, the thickness of the support ring 204 tapering to a thickness M (e.g., a greater thickness or maximum thickness) at a point closer to the trailing side 241 of the corresponding one the plurality of superhard bearing elements 220. Additionally, the properties of the reduced-thickness portion 210 may be substantially consistent across the width W of the support ring 204, or the properties may vary across the width W.

Figure 3:
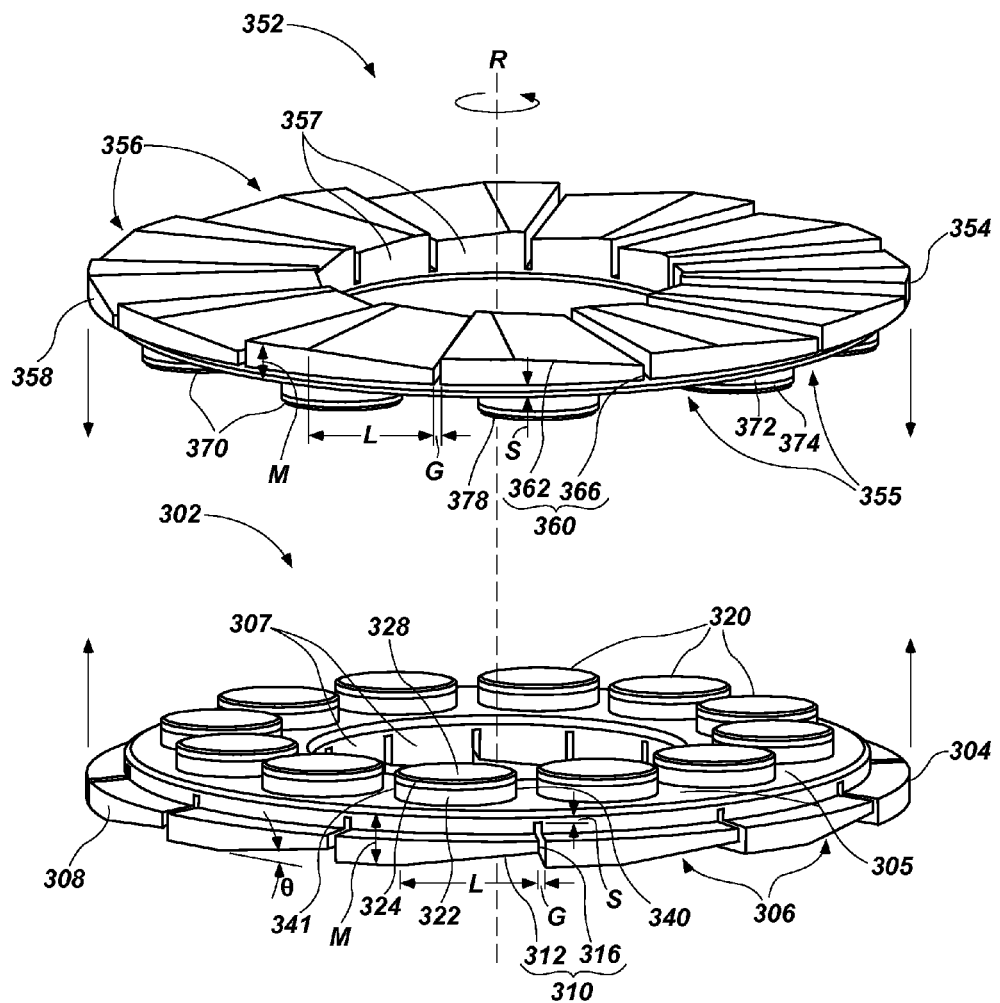
FIG. 3 is an exploded isometric view of two thrust-bearing assemblies that form a thrust-bearing apparatus according to an embodiment.
Figure 4A:
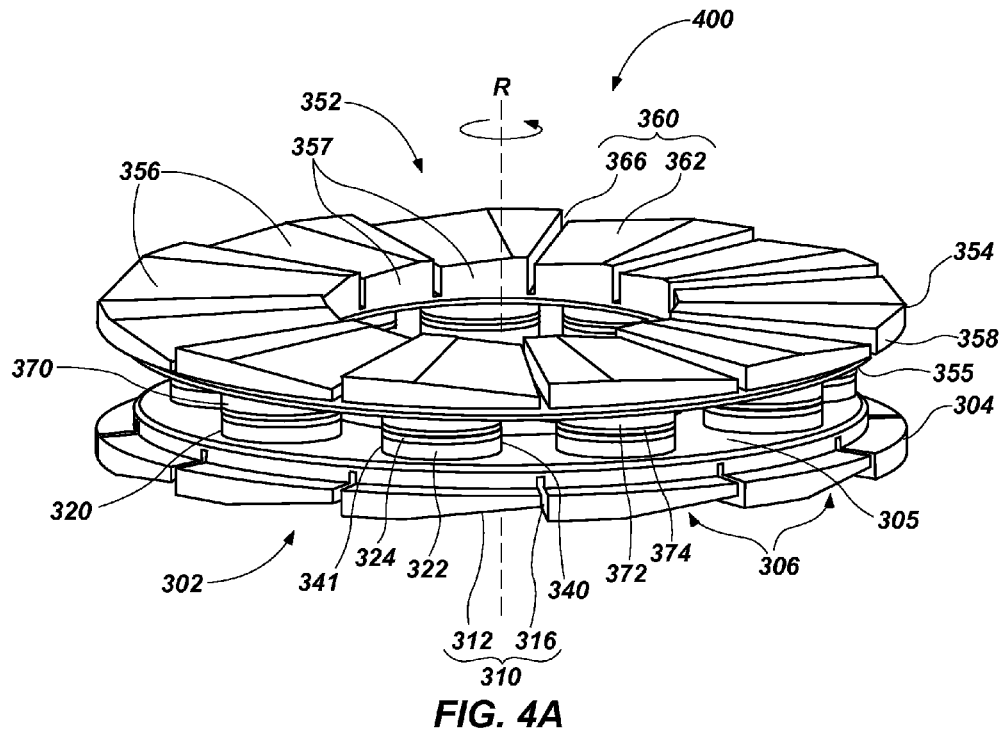
FIG. 4A is an isometric view of the thrust-bearing apparatus of FIG. 3 assembled.

In some embodiments, such as that shown in FIGS. 3 and 4A, a thrust-bearing apparatus 300 may include two opposing thrust-bearing assemblies that may be positioned such that the bearing surfaces thereof face each other and substantially contact each other absent a fluid film therebetween. In some embodiments, each of the opposing bearing assemblies 302 and 352 may be configured the same or similarly to the bearing assembly 104. In other embodiments, only one of the bearing assemblies 302 or 352 may be configured the same or similarly as the bearing assembly 104. For example, the thrust-bearing assembly 302 may include a support ring 304 having an upper surface 306, a lower surface 307, an inner radial surface 307, an outer radial surface 308, a plurality of superhard bearing elements 320 distributed circumferentially about a thrust/rotation axis "R," and a plurality of reduced-thickness portions 310. The plurality of reduced-thickness portions 310 may include one or more of a recessed surface 312 and a gap 316. Each of the plurality of superhard bearing elements 320 may include a leading side 340, a trailing side 341, and a bearing surface 328 therebetween. The leading side 340 and trailing side 341 being determined by the relative rotation of the support ring 302. Each of the plurality of superhard bearing elements 320 may include a substrate 322 and a bearing body or table 326 including any suitable shapes or materials described herein for the substrate and the bearing body, or may be configured according to any other type of bearing element disclosed herein. The reduced-thickness portion 310 exhibits a thickness S (e.g., reduced thickness or minimum thickness) proximate to the leading side of rotation of the corresponding superhard bearing element 320. The reduced-thickness portion 310 may taper or step from a thickness S to a greater thickness or even nominal thickness M (e.g., maximum thickness) at a location nearer to the trailing side of the corresponding superhard bearing element 320. The positions, angles, sizes, and configurations of the reduced-thickness portions 310 may resemble any described herein.

In some embodiments, an opposing thrust-bearing assembly 352 may include a support ring 354 having an upper surface 355, a lower surface 356, an inner radial surface 357, an outer radial surface 358, a plurality of superhard bearing elements 370 distributed about an axis (e.g., circumferentially distributed about a thrust axis), and a plurality of reduced-thickness portions 360. The plurality of reduced-thickness portions 360 may include a recessed surface 362 and/or a gap 366. Each of the plurality of superhard bearing elements 370 may include a leading side, a trailing side, and a bearing surface 378 therebetween. The leading side and trailing side being determined by the relative rotation of the support ring 352. Each of the plurality of superhard bearing elements 370 may include a substrate 372 and a bearing body or table 376 including any suitable shapes or materials described herein for a substrate and a bearing body. The reduced-thickness portions 360 may include one or more of a recessed surface 362 and a gap 366. The reduced-thickness portion having a smallest thickness proximate to the leading side of rotation of the corresponding superhard bearing element 370. The reduced-thickness portion 360, may taper, step, or otherwise transition from a thickness S (e.g., reduced or minimum thickness) up to the thickness M (e.g., greater thickness or maximum thickness) at a location nearer to the trailing side of the corresponding superhard bearing element 370. The positions, angles, sizes, and configurations of the reduced-thickness portions 360 may resemble any described herein. Either of the bearing assemblies 302 and 352 may be configured as a rotor or a stator.

As shown in FIG. 4A, the thrust-bearing assemblies 302 and 352 may be assembled such that the bearing surfaces 328 and 378 generally oppose each other. One of the thrust-bearing assemblies 302 or 352 may configured as a stator and the other one of the thrust-bearing assemblies 302 or 352 may be configured as a rotor. The resulting bearing apparatus 400 may function as a thrust bearing. In some embodiments, each superhard bearing element 320 and 370 may have a corresponding reduced-thickness portion 310 or 360 (FIG. 3) proximate thereto on the support ring 304 or 354. In such embodiments, each of the support rings 304 and 354 may elastically deflect or deform at the plurality of reduced-thickness portions 310, 360 (FIG. 3) such that fluid at the leading side of rotation may form or adjust hydrodynamic lift between the opposing bearing surfaces 328 and 378 to enable complete or partial hydrodynamic operation under certain thrust loads and rotational speeds.

In some embodiments, the support rings 304 and 354 of the bearing assemblies 302 and 352 may include the plurality of reduced-thickness portions 310 or 360 corresponding to every other superhard bearing element 320 or 370. In some orientations, in such a configuration when the bearing assemblies 302 and 352 are positioned to oppose each other, the superhard bearing element 320 or 370 having the corresponding reduced-thickness portion 310 or 360 opposite thereto on one support ring 304 or 354 opposes the superhard bearing element 370 or 320 that may not have the corresponding reduced-thickness portion 360 or 310 proximate thereto. In such an embodiment, the support rings 304 and 354 may exhibit more rigidity (e.g., undergoes less deformation) than support rings including reduced-thickness portions 310 or 360 corresponding to every superhard bearing element thereon, while still allowing some of the superhard bearing elements 320 and 370 on the support rings 304 and 354 to deflect away from the opposing bearing surface 328 or 378 to allow or adjust hydrodynamic fluid flow between opposing sets of superhard bearing elements 320 and 370. In some embodiments, such as illustrated in FIG. 4A, the reduced-thickness portions 310 and 360 may be oriented in the same direction (e.g., having recessed surfaces 312 and 362 tapering to a greater thickness along the same circumferential direction) such as both clockwise or counterclockwise.

Figure 4B:
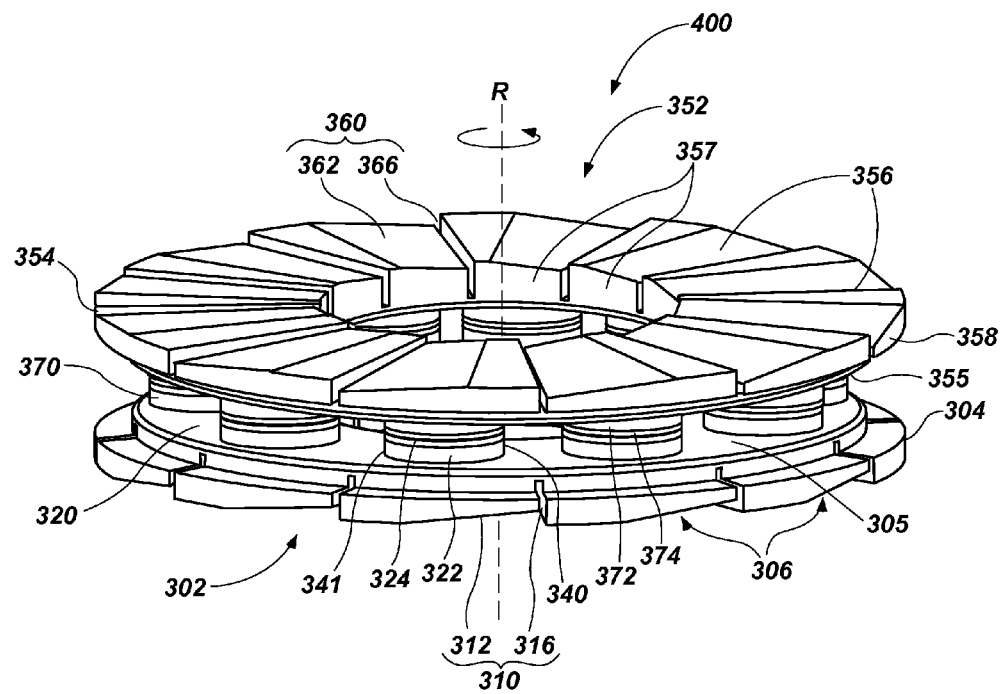
FIG. 4B is an isometric view of a thrust-bearing apparatus according to an embodiment.

In an embodiment, such as illustrated in FIG. 4B, the bearing assemblies 302 and 352 may be substantially as described above with respect to FIG. 4A, but exhibit an opposing orientation (e.g., having recessed surfaces 312 and 362 tapering to a greater thickness in different circumferential directions). Such a configuration would allow for both opposing bearing surfaces and support rings 302 and 352 to be displaced or deflected away from one another substantially simultaneously as the leading sides of the opposing superhard bearings elements 320 and 370 rotate past one another. Such dual deflection may produce and/or increase hydrodynamic flow between the opposing superhard bearing elements 520 and 720 as compared to a bearing apparatus only including one support ring having reduced thickness portions.

In some embodiments, a thrust-bearing apparatus may include one thrust-bearing assembly 302 comprising the support ring 304 including the plurality of superhard bearing elements 320 each having the bearing surface 328 thereon opposed to another surface (e.g., continuous ring, thrust face, or collar).

Figure 4C:
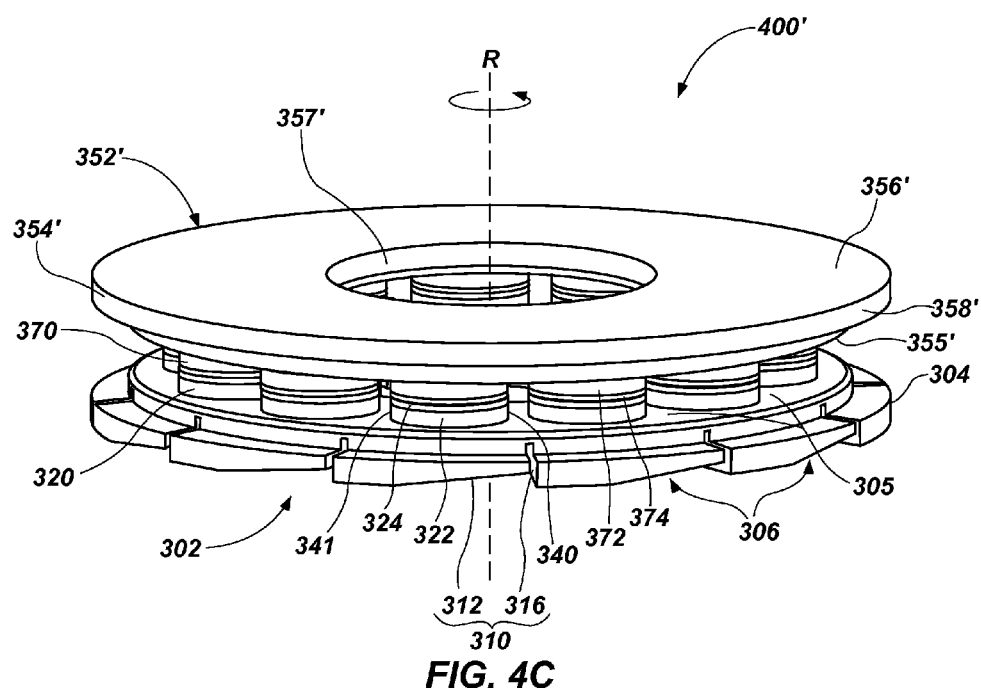
FIG. 4C is an isometric view of a thrust-bearing apparatus according to an embodiment.

In an embodiment, a bearing assembly 302 may oppose a conventional bearing assembly (e.g., a bearing assembly not having reduced thickness portions). As illustrated in FIG. 4C, the bearing assembly 302 may be substantially identical to the bearing assemblies described above with respect to FIGS. 3-4B. The bearing assembly 302 may oppose a bearing assembly 352' including bearing elements 370 disposed about a support ring 354'. The support ring 354' may include an upper surface 355', a lower surface 356', and an inner surface 357' and outer surface 358' both extending therebetween. The lower surface 355' of the support ring 354' may be substantially planar (e.g., a conventional support ring having no reduced-thickness portions). In such an embodiment, the support ring 304 may be configured to displace or deflect away from the support ring 354'. The plurality of reduced-thickness portions 310, such as any described herein, may correspond to the plurality of superhard bearing elements 320 on the opposite surface of the support ring 304 such that the reduced-thickness portion exhibiting the thickness S may be selectively located proximate to the leading side of the corresponding superhard bearing element. In such embodiments, the support ring 304 may deflect or deform away from the opposing surface at or near the location where the support ring 304 exhibits the reduced-thickness portion 310. The bearing assembly 302 may be configured as a stator or a rotor (as shown).

Figure 5A:
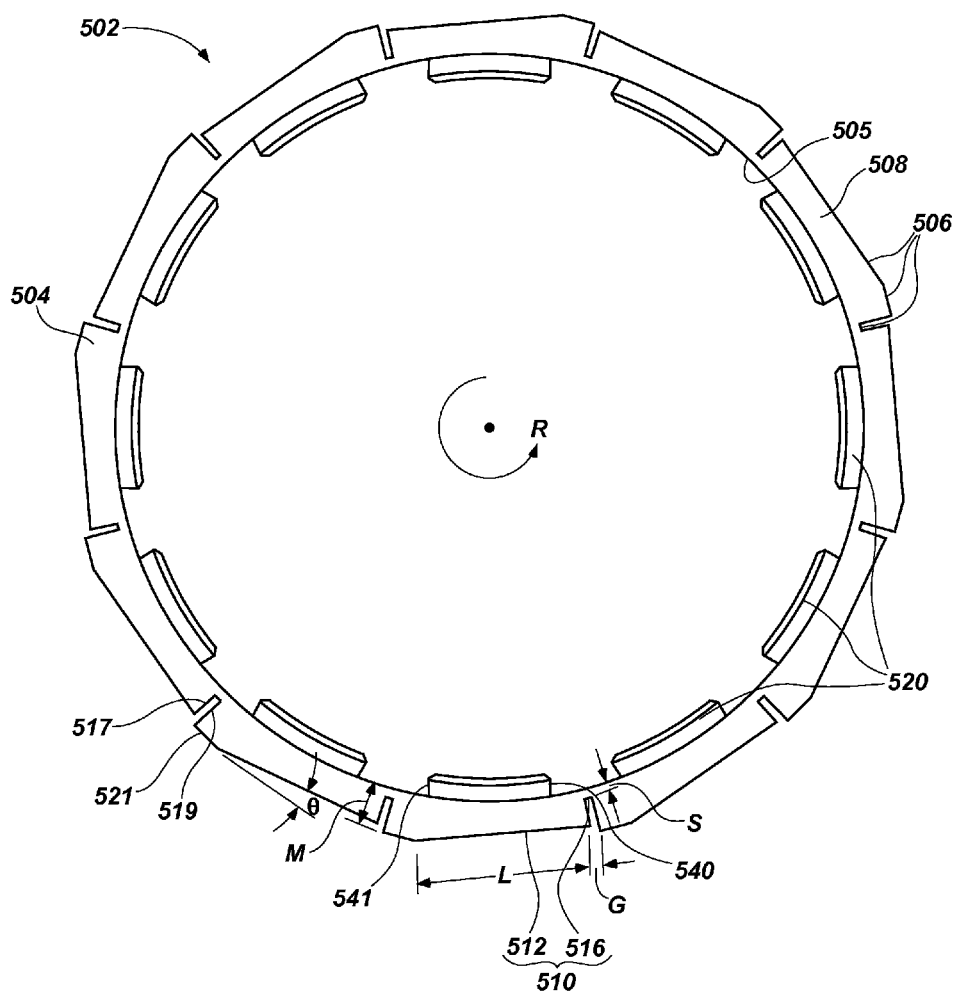
FIG. 5A is a top plan view of a radial bearing assembly according to an embodiment.

In some embodiments, such as those shown in FIGS. 5A-5E, a bearing assembly comprising a support ring including reduced-thickness portions may be configured to function as a radial bearing. FIG. 5A is top plan view of a radial bearing assembly 502 including a support ring 504 according to an embodiment. The support ring 504 may include a substantially radially uniform inner surface 505 (with the exception of the superhard bearing elements attached thereto) facing inward toward a center point about which an axis of rotation is centered, an outer surface 506 generally opposite the inner surface 505, and outer surfaces 508 between the inner surface 505 and the outer surface 506 on either side of the support ring 504. The support ring 504 may include a plurality of superhard bearing elements 520 distributed circumferentially about the axis of rotation. Each superhard bearing element includes a leading side 540, a trailing side 541, and a bearing surface 528 therebetween. The leading side 540 and trailing side 541 may be determined from the relative direction of rotation R of the support ring 504. The support ring 504 may include a plurality of reduced-thickness portions 510. Each of the plurality of reduced-thickness portions 510 may be defined by a reduced-thickness dimension between the inner surface 505 and the outer surface 506 of the support ring 504 relative to an adjacent portion of the support ring 504 and/or the thickness M (e.g., greater thickness or maximum thickness) of the support ring 504. The reduced-thickness portions 510 includes a portion having a thickness S (e.g., reduced thickness or minimum thickness) selectively positioned proximate to the leading side 540 of the corresponding superhard bearing element 520 on the opposite surface of the support ring 504, and tapering or stepping to the thickness M at a location on the support ring 504 closer to the trailing side 541. In some embodiments, the reduced-thickness portions 510 are configured to allow and promote deformation of the support ring 504 in a radially outward direction (i.e., away the center of the axis of rotation) to promote or adjust hydrodynamic fluid flow or behavior.

In some embodiments, the plurality of reduced-thickness portions 510 may include a recessed surface 512 and/or a gap 516. The recessed surface 512 may be extend along circumferential length L of the support ring 504, providing the support ring 504 with the reduced-thickness dimension that tapers to the thickness M along the length L from a location proximate to the leading side 540 of the corresponding superhard bearing element to a location closer to the trailing side 541 of the corresponding superhard bearing element, thereby at least partially defining the recessed surface 512. The recessed surface 512 may exhibit an angle θ with respect to an adjacent portion of the support ring 504. The recessed surface 512 may terminate at a gap wall surface 517 or 519 and/or at a support surface 521 (e.g., a flat or land of the lower surface of the support ring). For example, the support surface 521 may be substantially planar, curved (e.g., substantially match a concave or convex cylindrical geometry of an underlying support), irregularly shaped surfaces, or combinations thereof. The gap wall surfaces 517 and 519 may be substantially parallel to one another or may be radially varying (e.g., increasing or decreasing radially at an angle perpendicular to the upper surface of the support ring). The recessed surface 512 may exhibit any of the configurations, angles, positions, or thicknesses described above with respect to recessed surfaces 112, 212, 312, and 512.

In some embodiments, the plurality of reduced-thickness portions 510 may include the gap 516. The gap 516 may exhibit a gap width G extending from the gap wall surface 517 (e.g., on the leading side of one recessed surface 112) to the gap wall surface 519 (e.g., on the trailing side of the preceding recessed surface 512 or portion of the support ring exhibiting a greater thickness), thereby at least partially defining the gap 516. The support ring 504 may exhibit the reduced-thickness dimension in the gap 516 that is smaller than the reduced-thickness dimension of the recessed surface 512 thereby defining a thickness S (e.g., minimum thickness) of the support ring 504. The gap width G may be less than, equal to, or greater than the distance between adjacent superhard bearing elements, such as any of those gap distances G described above.

In some embodiments, the plurality of reduced-thickness portions 510 may only include the recessed surfaces 512. In some embodiments, the plurality of reduced-thickness portions 510 may only include gaps 516. For example, a reduced-thickness portion may include one or more gaps 516, thereby at least partially defining a stepped lower surface proximate to a corresponding superhard bearing element in a manner substantially similar to any of those described above. In such embodiments, the gap 516 or plurality of gaps 516 may be selectively positioned proximate to the leading side 540 of the corresponding superhard bearing element 520, and may extend along the circumferential length L of the support ring sufficient to allow the support ring to flex when the leading side 540 of the superhard bearing element 520 deflects away from another surface or superhard bearing element to create, adjust, or allow hydrodynamic fluid flow/behavior between the opposing bearing surfaces. For example, the gap widths G or sum of gap widths G may extend a circumferential length L of about half or more of the greatest lateral dimension (e.g., circumferential diameter, width, or length) of the corresponding superhard bearing element.

In some embodiments, the plurality of superhard bearing elements 520 may be substantially similar to any of those described herein, including but not limited to geometric configuration (e.g., shape or height), material composition, use of a substrate or lack thereof, positioning and/or amount used, or combinations of the any of the foregoing. In some embodiments including a radial or journal bearing assembly, the bearing surface 528 may be concave (e.g., generally cylindrical or generally spherical) or convex (e.g., generally cylindrical or generally spherical) to accommodate or complement, the opposing surface (e.g., a journal, or opposing radial bearing assembly).

Figure 5B:
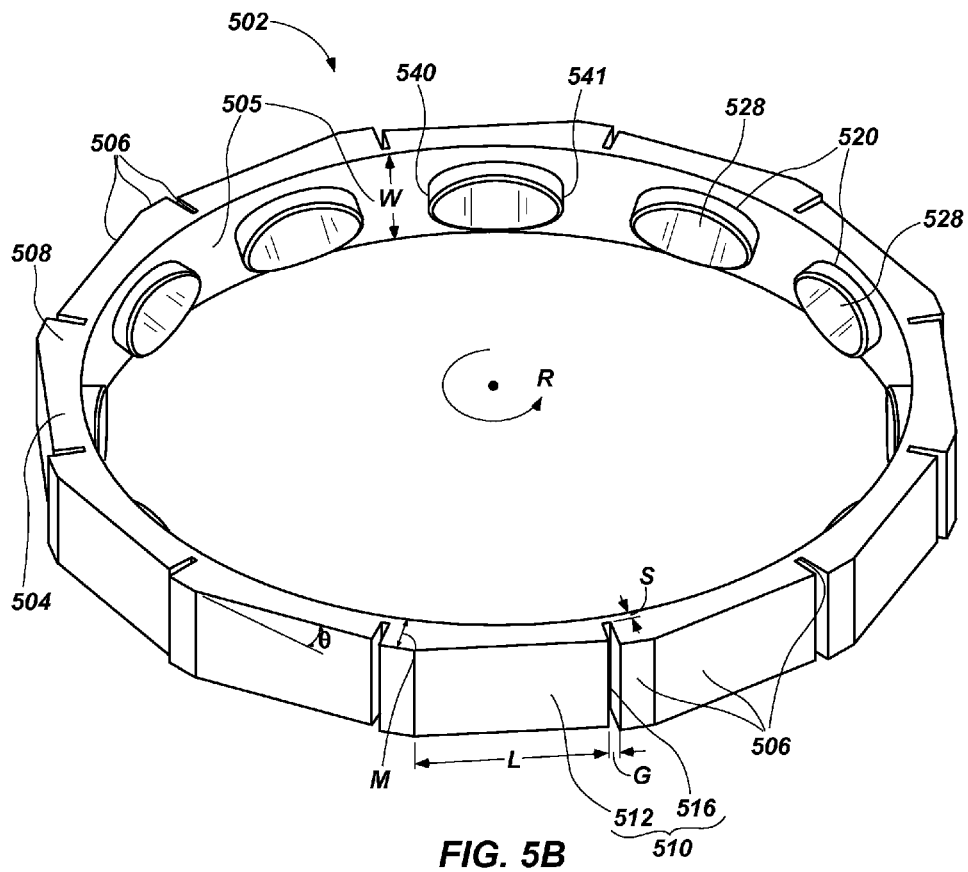
FIG. 5B is an isometric view of the radial bearing assembly of FIG. 5A.

As shown in FIG. 5B, the outer surface 506 may partially define the plurality of reduced-thickness portions 510, including the plurality of recessed surfaces 512 and/or gaps 516 that extend across the width W of the support ring 504. In some embodiments including the gaps 516, the gaps 516 may be at least partially defined by a first portion of the lower surface proximate to the leading side of the superhard bearing element 520 and a second portion of the lower surface proximate to the trailing side of the preceding superhard bearing element 520, wherein the first and second portions of the outer surface 506 may be substantially perpendicular to the inner surface 505 and further define the gap 516 between therebetween. The inner surface 505 may have any shape or configuration including, but not limited to cylindrical, a plurality of planar surfaces, a plurality of non-planar surfaces, and combinations of the foregoing. In some embodiments, the width W of the support ring 504 may be sufficient to allow one or more of the plurality of superhard bearing elements 520 across the width W at a circumferential position on the support ring. For example, the width W may be sufficient to allow a single row of superhard bearing elements 520 on the support ring 504, a staggered configuration of superhard bearing elements 520 (i.e., one superhard bearing element fitting at a point lateral and subsequent to another superhard bearing element), or more than one row of superhard bearing elements extending around the support ring.

Figure 5C:
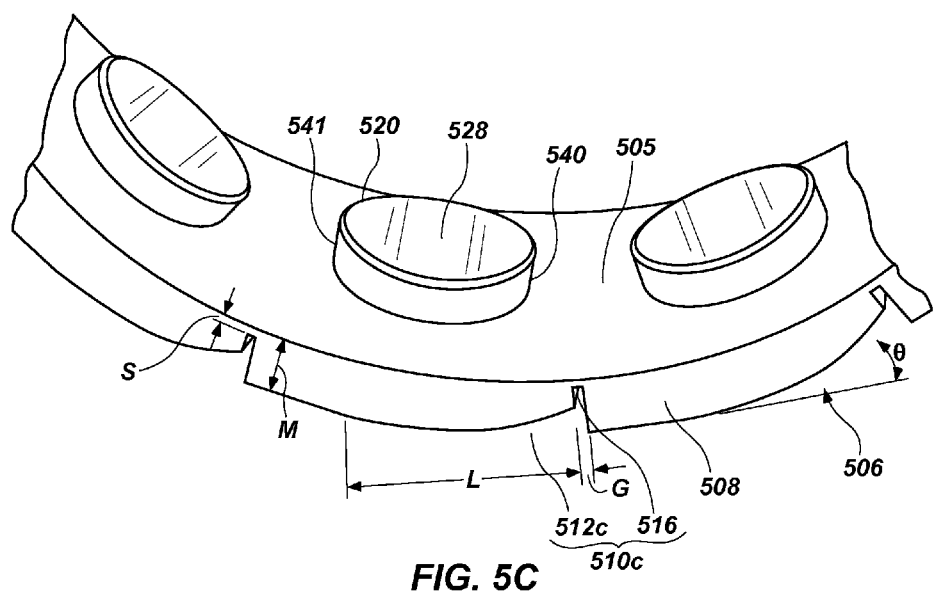
FIG. 5C is a partial, isometric cutaway view of a radial bearing assembly according to an embodiment.

According to an embodiment shown in FIG. 5C, the support ring 504 may include a plurality of reduced-thickness portions 510c each of which includes a recessed surface 512c sloping at an angle that varies along the circumferential length L of the recessed surface 510c. For example, the reduced-thickness portions 510c exhibits a smaller thickness at a location nearest the leading side of the corresponding one of the plurality superhard bearing elements 520 and increase in thickness along the circumferential length L as the reduced-thickness portion 510c approaches a point nearer the trailing surface of the corresponding one of the plurality superhard bearing elements 520, until the reduced-thickness portion 510c reaches the thickness M. The reduced-thickness portion 510c may form an angle θ with respect to an adjacent portion of the support ring 504, or the angle θ may change and/or change at different positions along recessed surface 512c. For example, the recessed surface 512c may be arcuate (e.g., a convex recessed surface 510c). In some embodiments, recessed surface 512c may form a concave recessed surface (not shown). The recessed surface 510c may terminate at a location along the length L where the reduced-thickness portion 510c reaches the thickness M. In some embodiments, the support surface 521 may exhibit a nominal thickness M over the remainder of the circumferential length L until the subsequent reduced-thickness portion. As noted above, each of the plurality of reduced-thickness portions 510 may extend circumferentially along a proportion of the outer surface 506 of the support ring 504 in relation to the greatest circumferential diameter, width, or length of the corresponding superhard bearing element 520 proximate to the recessed surface 512. For example, the circumferential length L of the recessed surface 512c may be about 40% or more of the greatest lateral dimension (e.g., circumferential diameter, width, or length) of the corresponding superhard bearing element 520, such as about 40% to about 200%, about 50% to about 150%, about 75% to about 125%, about 100%, or any of the percentages or ranges of percentages of the greatest lateral dimension of the corresponding superhard bearing element 520 disclosed herein.

Figure 5D:
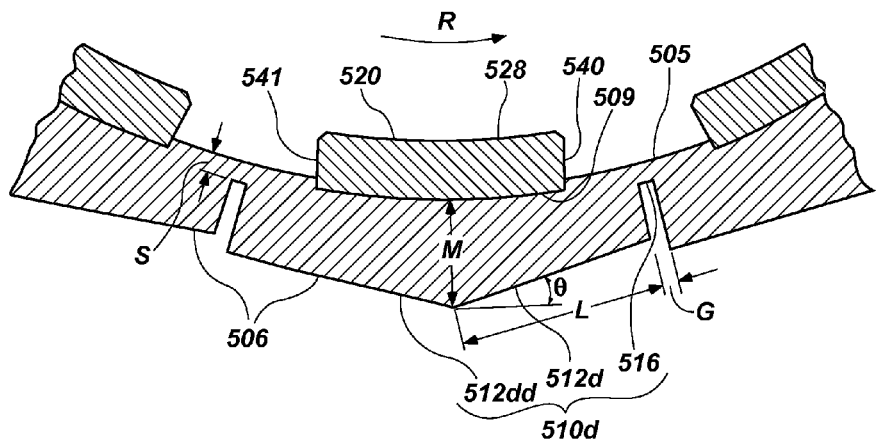
FIG. 5D is a partial, cross-sectional view of the radial bearing assembly of FIG. 5A.

In some embodiments, such as that shown in FIG. 5D, the reduced-thickness portion 510d may increase in thickness over portion of the circumferential length L from a reduced thickness at a location nearest the leading side of the corresponding one of the plurality of superhard bearing elements until the support ring 504 reaches the thickness M at a point nearer the trailing side of the corresponding superhard bearing element (e.g., the endpoint, midpoint or some other intermediate point, or after the endpoint of the corresponding superhard bearing element), thereby at least partially defining the recessed surface 512d. The reduced-thickness portion 510d may then decrease in thickness from the nominal thickness M over the remaining portion of the circumferential length L of the reduced-thickness portion 510d to a reduced thickness at a location proximate to the trailing end of the corresponding superhard bearing element to form a second recessed surface 512dd. The recessed surface 512dd may exhibit any feature, any angle θ, or any configuration for any recessed surface described herein, irrespective of the angle θ or configuration of the recessed surface 512d. Such embodiments may function to allow the support ring and associated superhard bearing elements thereon to deform (e.g., deflect or dip) away from an opposing surface to accommodate (e.g., create or adjust) hydrodynamic fluid flow therebetween regardless of the direction of the rotation of the support ring. Such embodiments may be operated in either a clockwise rotation or a counterclockwise rotation. Embodiments such as that described immediately above, may also include a gap 516, such as any described herein, in combination with the recessed surfaces 512d and 512dd to form the reduced-thickness portion 510d. In some embodiments, the recessed surfaces 512d and 512dd may be convex slopes such as any described herein in which the resulting reduced-thickness portion may exhibit a generally rounded outer surface along the circumferential length L of the reduced-thickness portion. In some embodiments, the recessed surfaces 512d and 512dd may be concave slopes such as any described herein in which the resulting reduced-thickness portion may be defined by a lower surface converging in a cusp or point along the circumferential length L of the reduced-thickness portion.

In some embodiments, the plurality of superhard bearing elements 520 may be attached to or otherwise mounted on the support ring using any one of a number of means such as welding, soldering, brazing, mechanical attachment, press-fitting, or any other suitable means of attachment.

Figure 5E:
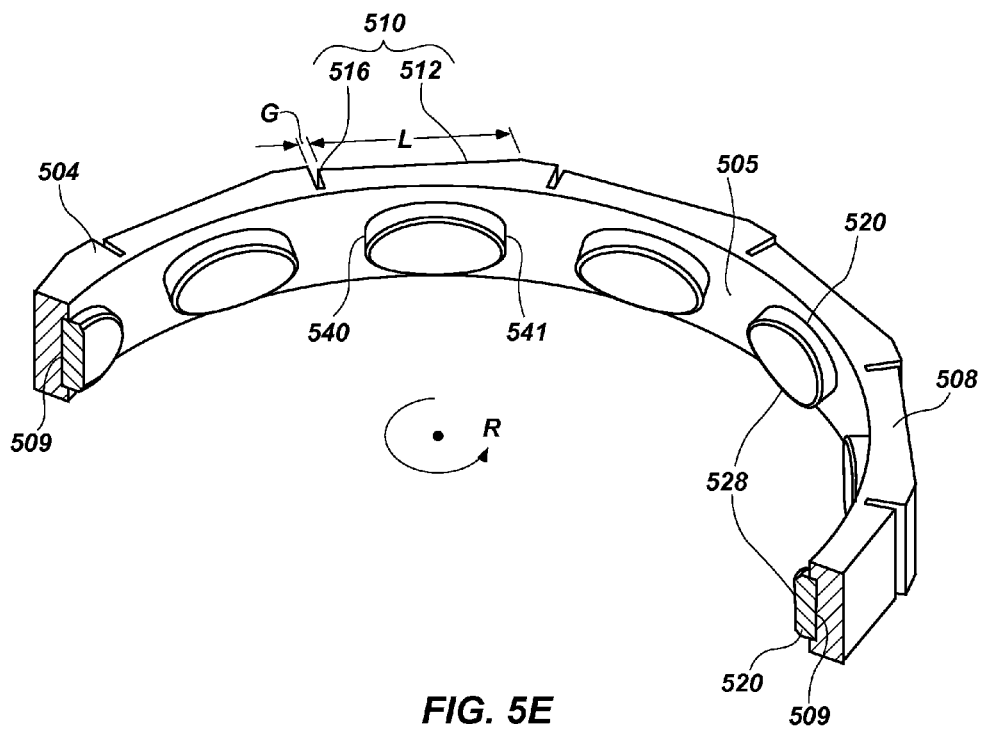
FIG. 5E is an isometric cutaway view of a radial-bearing assembly according to an embodiment.

As shown in FIG. 5E, a radial or journal bearing assembly may include the support ring 504 having a plurality of pockets or recesses 509 formed therein to at least partially accommodate and affix the plurality of superhard bearing elements 520 therein. In some embodiments, the plurality of recesses 509, plurality of superhard bearing elements 520, and plurality of reduced-thickness portions 510 may be configured to ensure that the plurality of superhard bearing elements do not extend to or through the outer surface 506 of the support ring 504

(i.e., the reduced-thickness portions 510 leave a thickness sufficient to form the recess 509 in the support ring 504 proximate to the reduced-thickness portion without protruding therethrough). The depth of the recesses 509 may be less than the thickness S of the support ring 504. For example, the depth of the recesses 509 in the support ring 504 as measured from the inner surface 505 may be 250 μm or more, such as about 250 μm to about 3 cm, about 500 μm to about 2 cm, about 1 μm to about 1 cm, about 2 mm to about 8 mm, about 3 mm to about 6 mm, about 1.5 cm, about 1 cm, or about 5 mm. In some embodiments, the depth of the recess 509 in the support ring 504 as measured from the inner surface 505 may be a proportion of the thickness of the support ring at the location in which the recess is formed, such as about 95% or less of the thickness of the support ring at the location in which the recess 509 is formed, about 95% to about 5%, about 90% to about 10%, about 80% to about 20%, about 60% to about 40%, about 50%, about 75%, or about 25% of the thickness of the support ring at the location in which the recess 509 is formed.

Figure 5F:
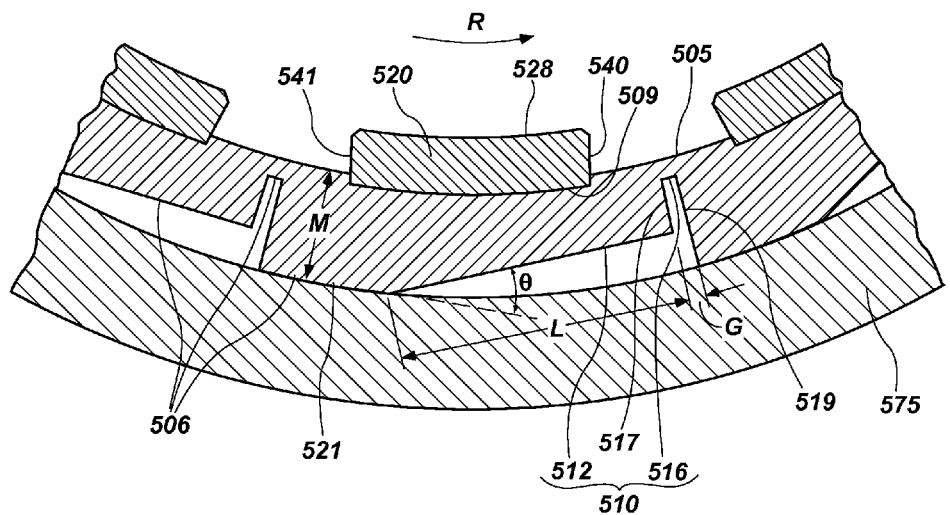
FIG. 5F is a partial, cross-sectional side view of the radial-bearing assembly of FIG. 5A.
Figure 5G:
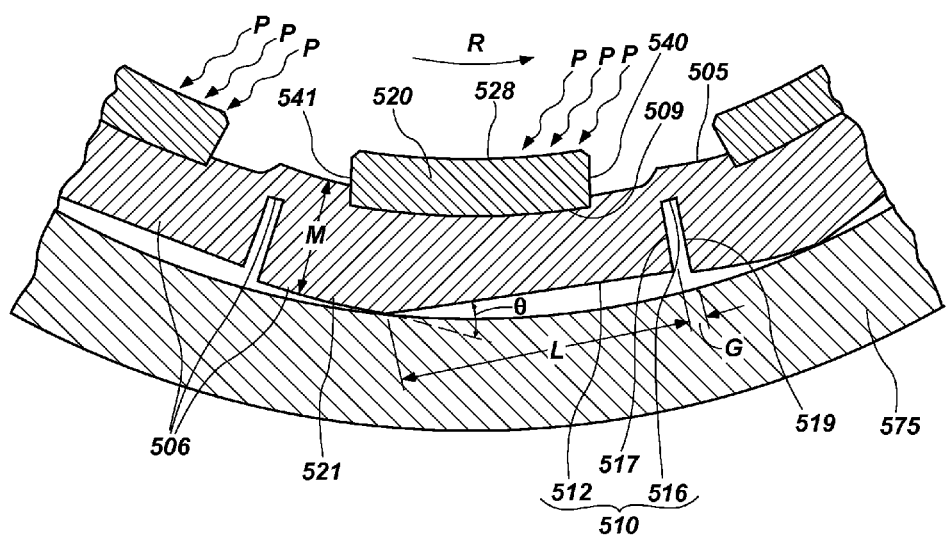
FIG. 5G is an exaggerated, partial, cross-sectional side view of the radial-bearing assembly of FIG. 5A during use.

FIGS. 5F and 5G depict the bearing assembly 502 including the support ring 504, as described above, before and during use (in an exaggerated view), respectively. As shown in FIG. 5F, a portion of the lower surface 506 (e.g., the support surface 521), may be in contact with a support 575 (e.g., a wall, housing, etc.). There may be a distance between the support 575 and the reduced thickness portions 510. During operation, as shown in FIG. 5G, the pressure P may be exerted on the bearing surface 528 near the leading side 540. Responsive to the pressure P, the bearing surface 528 and underlying support ring 502 may deflect away from an opposing surface (not shown) into the empty space between the support 575 and the support ring 504 created by the reduced-thickness portion 510. The amount of displacement/deflection depicted in FIG. 5G is exaggerated to illustrate displacement during use. In some embodiments, the support surface 521 may remain substantially or completely in contact with support 575 during use. The distance of displacement/deflection may vary based on the size of the support ring, size of the bearing elements, thickness of the support ring (both inside and outside of the reduced thickness portion), amount of pressure P exerted by the fluid, and other characteristics of the bearing apparatus without limitation. In an embodiment, the leading side 540 of a bearing surface 528 of a bearing element 120 may deflect 0.00001 inches or more away from an opposing surface during use, such as about 0.00001 inches to about 0.003 inches, about 0.00002 inches to about 0.002 inches, about 0.00005 inches to about 0.001 inches, about 0.00045 inches, about 0.0007 inches about 0.001 inches, or about 0.002 inches.

Figure 6:
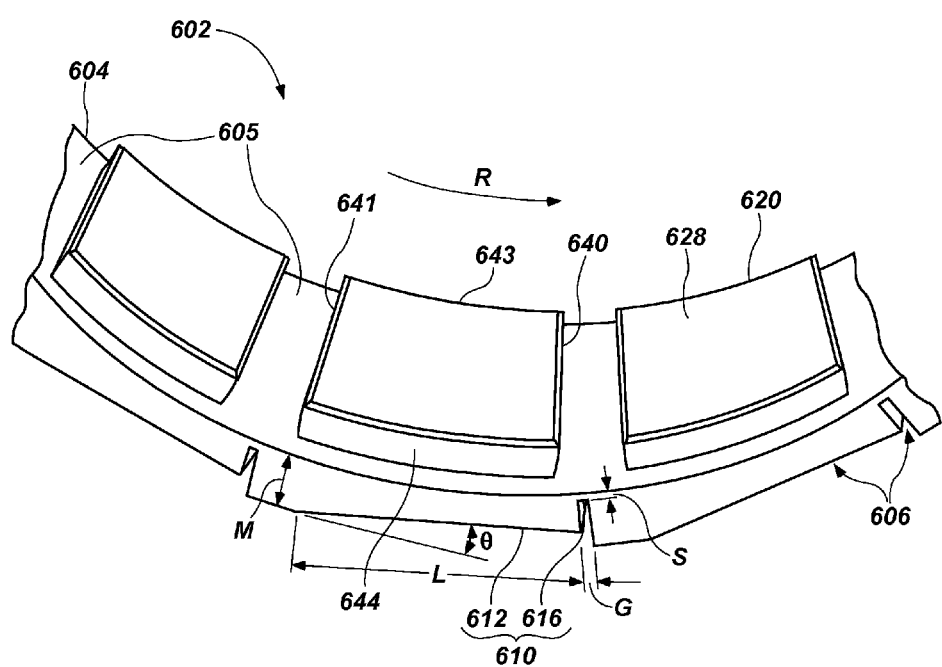
FIG. 6 is an isometric cutaway view of a radial bearing assembly according to an embodiment.

While shown as having a plurality of cylindrical superhard bearing elements in FIGS. 5A-5G, a radial or journal bearing assembly may include a plurality of superhard bearing elements having a different shape, such as any superhard bearing element shapes described herein. For example, in some embodiments such as that shown in FIG. 6, a radial or journal bearing assembly 602 may comprise a support ring 604 including an upper surface 605 having a plurality of superhard bearing elements 620 with a bearing surface 628 exhibiting a substantially rectangular shape (e.g., generally rectangular with rounded corners) attached thereto, and a lower surface 606, and a plurality of reduced-thickness portions 610 thereon. The plurality of superhard bearing elements 620 exhibiting a rectangular bearing surface geometry may be configured to create a selected amount of bearing surface area on the bearing assembly 602. The plurality of superhard bearing elements 620 exhibiting a rectangular bearing surface geometry may include any of the features described for a superhard bearing element described herein, including but not limited to, use of a substrate, composition of materials therein, size, spacing, or combinations of the foregoing. Each of the plurality of superhard bearing elements 602 exhibiting a rectangular geometry may have a leading side 640, a trailing side 641, a first end 643, and a second end 644. Each of plurality of reduced-thickness portions 610 being disposed proximate to and on the opposite (e.g., lower surface) a corresponding one of the plurality of superhard bearing elements 620. The reduced thickness portions 610 may include one or more of a recessed portion 612 and a gap 616. The support ring 604 and each of the plurality of reduced-thickness portions 610, including a recessed portion 612 and/or gap 616, may be configured substantially identical to any of the embodiments of a support ring and reduced-thickness portions described herein.

Figure 7:
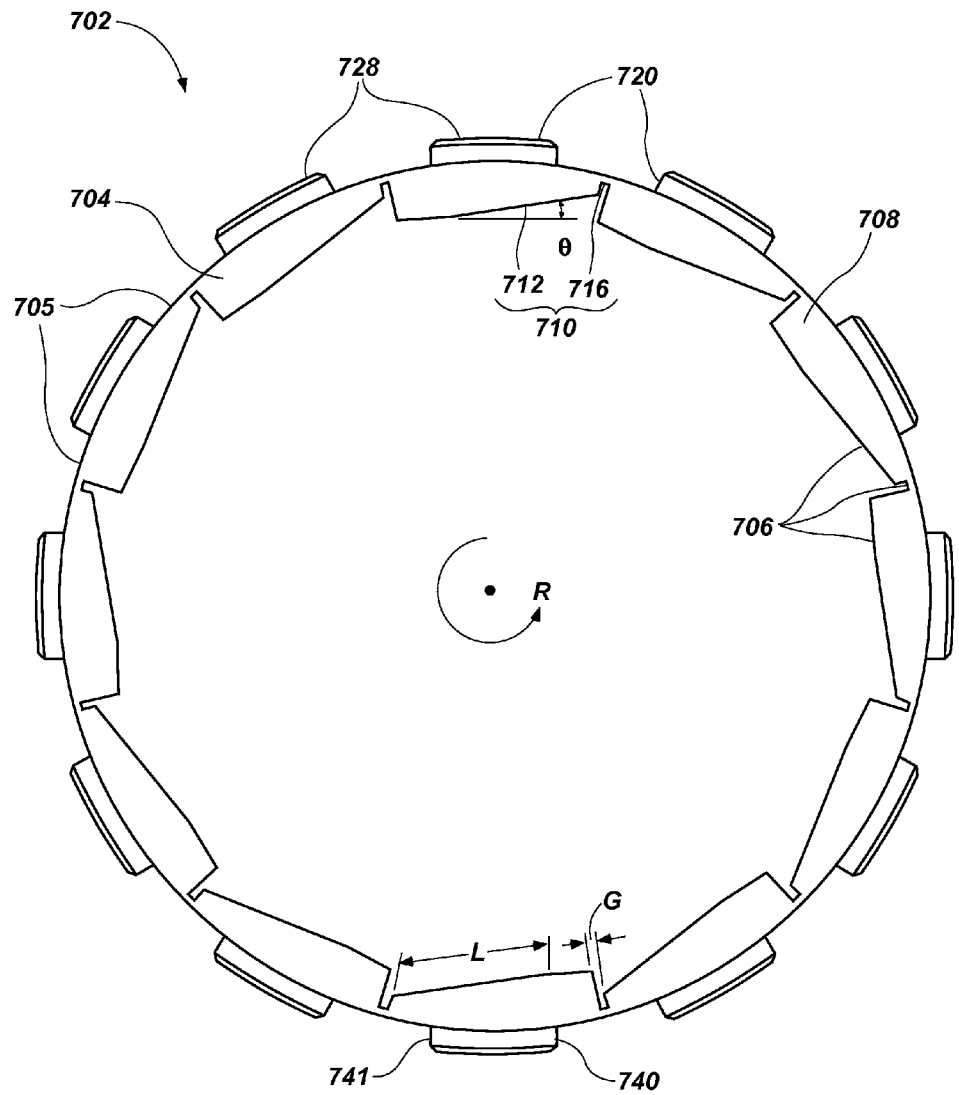
FIG. 7 is a top plan view of a radial bearing assembly according to an embodiment.

In some embodiments such as that shown in FIG. 7, a radial bearing assembly 702 may comprise a support ring 704 including an outer surface 705 facing away from the center point of the bearing assembly (e.g., the axis of rotation) and having a plurality of superhard bearing elements 720 distributed circumferentially thereon, an inner surface 706 facing inwardly toward a center point/rotation axis of the radial-bearing assembly 702, and peripheral surfaces 708 therebetween. The superhard bearing elements 720 may have a leading side 740 and a trailing side 741, depending on the direction of rotation R of the support ring 704. The support ring 704 may include a plurality of reduced-thickness portions 710 at last partially defined by the inner surface 706. The reduced-thickness portions may include a recessed portion 712 and/or a gap 716. In some embodiments, the reduced-thickness portions 710 are configured to allow and promote deformation of the support ring 704 in a radially inward direction (i.e., toward the center of the axis of rotation) to promote or adjust hydrodynamic fluid flow. The plurality of reduced-thickness portions 710, including any recessed portion 712 and/or gap 716 therein, may be substantially similar to, identical to, or exhibit substantially similar features, configurations or combinations thereof as any of the plurality of reduced-thickness portions disclosed herein. In some embodiments, the bearing surfaces 728 of the plurality of the superhard bearing elements 720 may be convex such as generally cylindrical or generally spherical. Such a convex configuration may allow for use of the bearing assembly 702 with a complementary surface (e.g., inner bearing surface of another superhard bearing element).

Figure 8A:
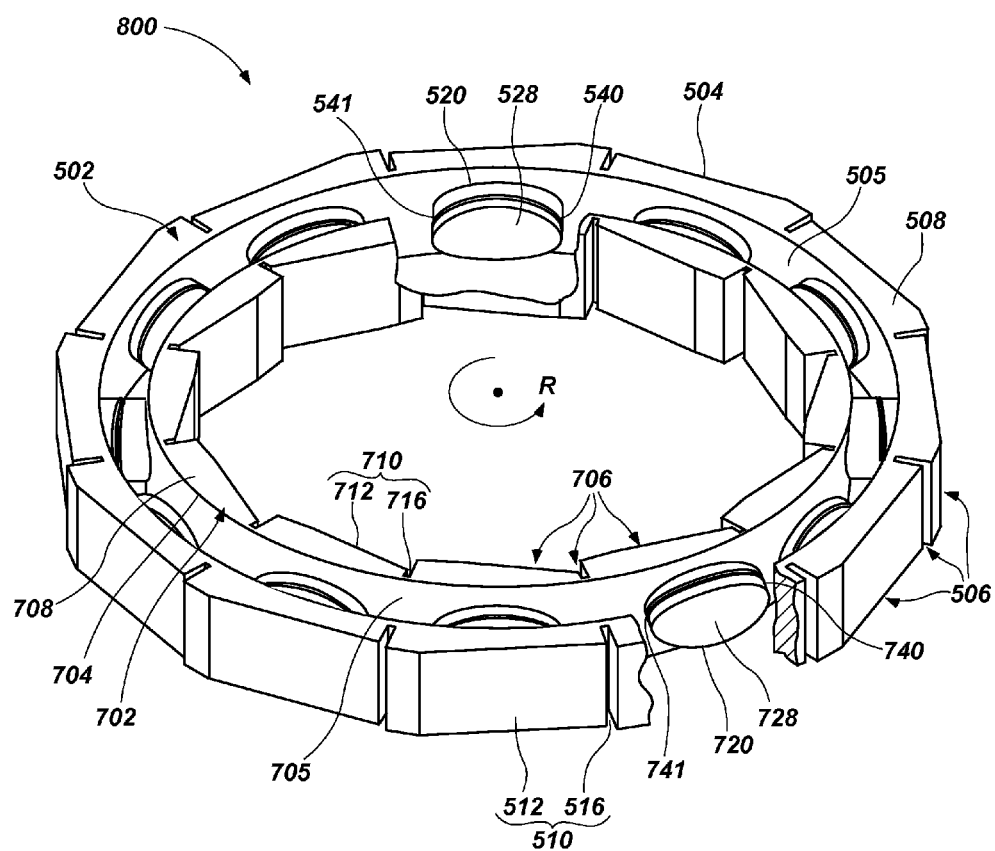
FIG. 8A is an isometric cutaway view of a radial bearing apparatus according to an embodiment.

FIG. 8A depicts an embodiment of a radial bearing apparatus 800 including a first or outer radial bearing assembly 502 (e.g., race) that receives a second or inner radial bearing assembly 702. In some embodiments, the inner radial bearing assembly 702 may be configured as a rotor or a stator and the outer radial bearing assembly 502 may be configured as the other of a rotor or a stator. In an embodiment, the reduced thickness portions 510 and 710 may increase in thickness in the same circumferential direction, or in different circumferential directions.

Similar to the thrust-bearing apparatus 400 described above, the radial bearing apparatus 800 may include reduced-thickness portion 510 or 710 opposite each of the plurality of superhard bearing elements 520 or 720 on the respective support rings 504 and 704 on the bearing assemblies 502 and 702 substantially as described above. In some embodiments similar to those described above with respect to thrust-bearing apparatus 400, the radial bearing apparatus 800 may include the reduced-thickness portion 510 or 710 opposite every other one of the plurality of superhard bearing elements

Figure 8B:
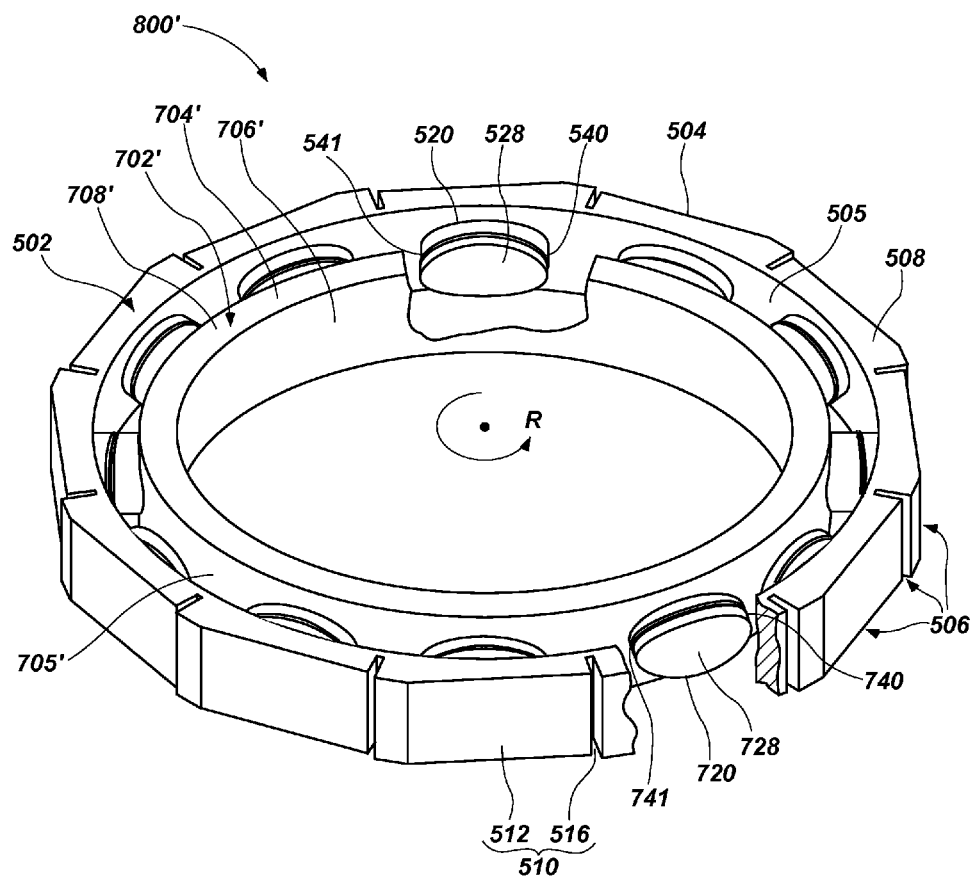
FIG. 8B is an isometric cutaway view of a radial bearing apparatus according to an embodiment.

520 or 720 on the respective support rings 504 and 704. In other embodiments, the support rings may only include reduced-thickness portions proximate to only one or more of the superhard bearing elements thereon, without limitation. In some embodiments, a bearing apparatus such as any described herein may only include reduced-thickness portions only on one support ring, wherein the opposing support ring has a substantially uniform thickness therethrough or is structured in another conventional manner. For example, as illustrated in FIG. 8B, the bearing apparatus 800' may include the support ring 504, substantially identical to the support ring 504 described above. The support ring 504 may oppose a bearing assembly 702' having a conventional support ring 704' including an upper surface 705', a lower surface 706', and peripheral surfaces 708' therebetween. The upper surface 705' of the support ring 704' may face radially outward and include a plurality of bearing elements 720 distributed circumferentially thereon. The bearing surfaces 728 may oppose the bearing surfaces 528. The lower surface 706' may be substantially smooth (e.g., having no recessed surfaces and/or gaps therein) and the support ring 704' may have a uniform thickness therethrough. In such an embodiment, the support ring 504 may be configured to be displaced or deflect way from the opposing surface when pressure is applied to the leading side 540 of the bearing elements 520. In FIG. 8B, the support ring 504 is depicted as a rotor, however, in other embodiments the support ring 504 may be a stator wherein the recessed portions 512 are oriented in the opposite direction to provide for deflection of the bearing surfaces and support ring 504. In an embodiment, the support ring 504 may exhibit a substantially uniform thickness (e.g., smooth lower surface) and the support ring 704 may be configured with reduced-thickness portions 710 to allow for deflection of the support ring to develop/enhance hydrodynamic flow between the bearing surfaces of the opposing bearing elements. In some embodiments, the radial bearing assembly 502 may be used with a shaft or journal to form a journal bearing without the inner bearing assembly 702.

Any feature described with respect to a thrust-bearing assembly may be used on a radial bearing assembly, and any feature described with respect to radial bearing assembly may be used on a thrust-bearing assembly, including without limitation, features, orientations, or configurations of the support rings and superhard bearing elements.

Figure 9:
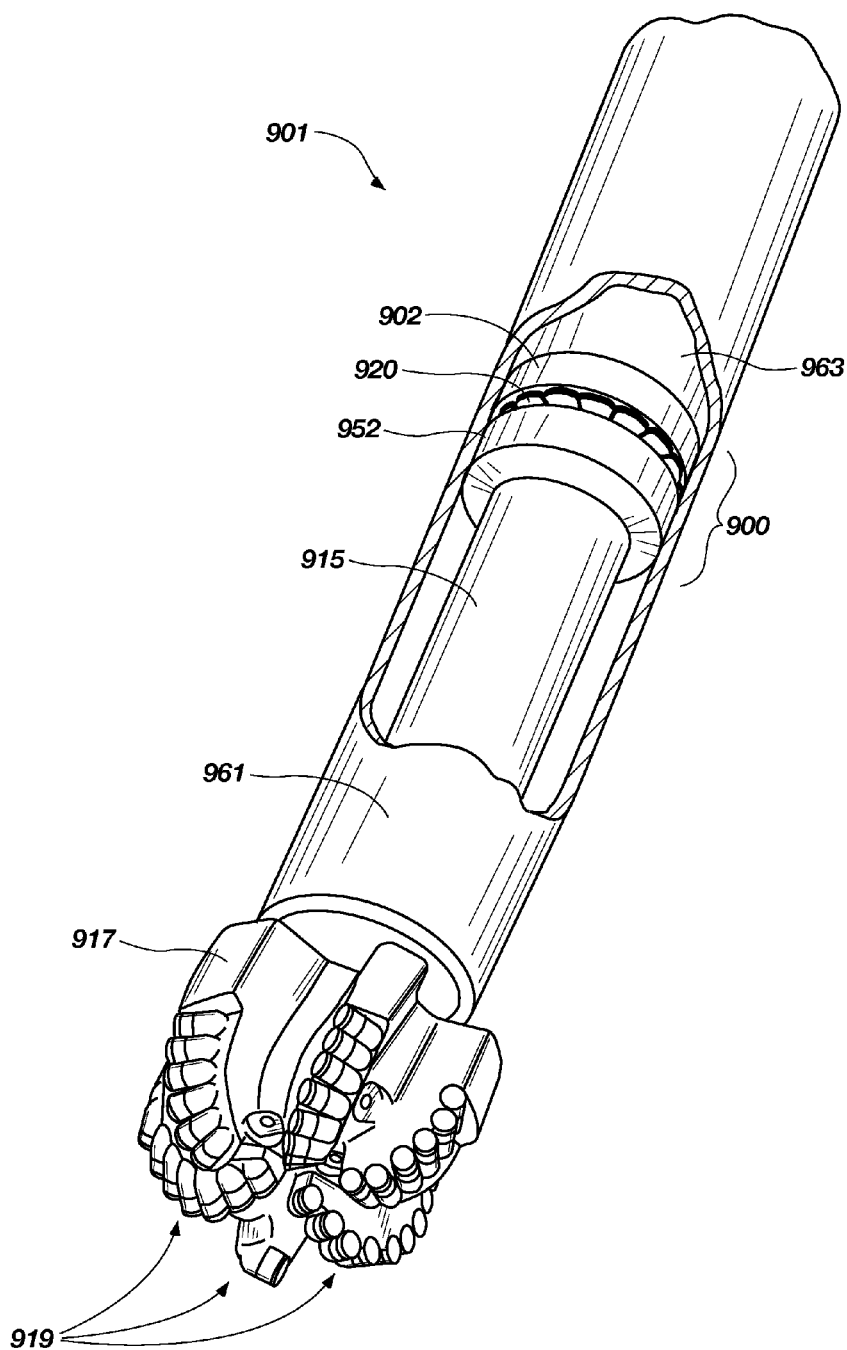
FIG. 9 is a schematic isometric cutaway view of a subterranean drilling system according to an embodiment.

FIG. 9 is a schematic isometric cutaway view of a subterranean drilling system 901 according to an embodiment. The subterranean drilling system 901 may include a housing 961 enclosing a downhole drilling motor 963 (i.e., a motor, turbine, or any other device capable of rotating an output shaft) that may be operably connected to an output shaft 915. A thrust-bearing apparatus 900 may be operably coupled to the downhole drilling motor 963. The thrust-bearing apparatus 900 may be configured as any of the previously described thrust-bearing apparatus embodiments including reduced-thickness portions therein. A rotary drill bit 917 may be configured to engage a subterranean formation and drill a borehole and may be connected to the output shaft 915. The rotary drill bit 917 is shown as a fixed cutter rotary bit including a plurality of superabrasive cutting elements 919. However, other embodiments may utilize different types of rotary drill bits, such as core bits, roller cone bits, eccentric bits, bicenter bits, reamers, reamer wings, or any other downhole tool including superabrasive cutting elements, such as PDCs. As the borehole is drilled, pipe sections may be connected to the subterranean drilling system 901 to form a drill string capable of progressively drilling the borehole to a greater size or depth within the earth. U.S. Pat. Nos. 4,410,054; 4,560,014; 5,364,192; 5,368,398; and 5,480,233, the disclosure of each of which is incorporated herein, in its entirety, by this reference, disclose subterranean drilling systems within which bearing apparatuses utilizing the PCD elements and/or PDCs disclosed herein may be incorporated.

The thrust-bearing apparatus 900 may include a stator 902 that does not rotate and a rotor 952 that may be attached to the output shaft 915 and rotates with the output shaft 915. As discussed above, the thrust-bearing apparatus 900 may be configured as any of the embodiments disclosed herein having a plurality of reduced-thickness portions. For example, the stator 902 and/or rotor the 952 may include a plurality of circumferentially-distributed superhard bearing elements 920 such as any described herein, and the support ring 904 and/or 954 may include a plurality of reduced-thickness portions substantially similar to any of those described herein.

The downhole drilling apparatus may include a radial bearing assembly such as any described herein. The radial bearing assembly may also be configured to be operably connected to the output shaft. Optionally, a radial bearing apparatus may be used, with one radial bearing assembly is operably connected to the output shaft and is positioned to oppose another radial bearing assembly operably connected to the inner surface of the housing. The opposing bearing assemblies being configured substantially similar to any described herein.

In operation, drilling fluid may be circulated through the downhole drilling motor 963 to generate torque and effect rotation of the output shaft 915 and the rotary drill bit 917 attached thereto so that a borehole may be drilled. A portion of the drilling fluid may also be used to lubricate opposing bearing surfaces of the stator and the rotor to provide hydrodynamic lift between the bearing surfaces of the stator and the rotor. When the rotor is rotated or the on the bearing assembly changes, the plurality of reduced-thickness portions or may deflect away from an opposing bearing assembly creating or adjusting hydrodynamic fluid flow between the bearing surfaces of the stator and/or the rotor, as disclosed herein.

In some embodiments, a method of using any of the bearing apparatuses or assemblies described herein may include forming one or more support rings such as any of those described herein, out of any of the materials described herein; forming a plurality of reduced-thickness portions thereon substantially similar to any of those described herein; affixing superhard bearing elements thereto, optionally including forming the superhard bearing elements according to any of the embodiments described herein; positioning and/or aligning the bearing assembly or opposing bearing assemblies such that the bearing surfaces thereon are aligned with an opposing surface or bearing surfaces; and operating the bearing apparatus in an at least partially hydrodynamic mode sufficient to create or adjust hydrodynamic fluid flow between the opposing bearing surfaces. The support ring may be made by casting the general shape thereof and any of the features thereon, or by forming a substantially cylindrical or round ring and then machining (e.g., milling, turning, lasing, electrical discharge machining ("EDM"), grinding, lapping, or combinations thereof).

While various aspects and embodiments have been disclosed herein, other aspects and embodiments are contemplated. The various aspects and embodiments disclosed herein are for purposes of illustration and are not intended to be limiting. Additionally, the words "including," "having," and variants thereof (e.g., "includes" and "has") as used herein, including the claims, shall be open ended and have the same meaning as the word "comprising" and variants thereof (e.g., "comprise" and "comprises").

What is claimed is:

1. A bearing assembly, comprising:
   a plurality of superhard bearing elements distributed circumferentially about an axis, each of the plurality of superhard bearing elements including a leading side and a trailing side; and
   a support ring having the plurality of superhard bearing elements mounted thereto, the support ring including:
   a first surface; a second surface spaced from the first surface; and
   a plurality of reduced-thickness portions each of which exhibits a reduced-thickness dimension, the reduced-thickness dimension being defined between the first and second surfaces of the support ring, each of the plurality of reduced-thickness portions located proximate to the leading side of a respective one of the plurality of superhard bearing elements and including a recessed surface having the reduced-thickness dimension proximate to the leading side of one of the plurality of superhard bearing elements that tapers to a greater thickness dimension at a location nearer to the trailing side of the one of the plurality of superhard bearing elements.

2. The bearing assembly of claim 1 wherein the recessed surface of one of the plurality of reduced-thickness portions forms an angle with respect to the adjacent portion of the support ring of more than 0 degrees to about 70 degrees.

3. The bearing assembly of claim 1 wherein the recessed surface exhibits a circumferential length equal to or greater than a maximum lateral dimension of the proximate one of the plurality of superhard bearing elements.

4. The bearing assembly of claim 1 wherein each of the plurality of reduced-thickness portions is proximate to the leading side of a respective one of the plurality of superhard bearing elements and a trailing side of a different, respective one of the plurality of superhard bearing elements.

5. The bearing assembly of claim 1, wherein the support ring includes a plurality of gaps in the second surface, each of the plurality of gaps positioned between adjacent superhard bearing elements of the plurality of superhard bearing elements.

6. The bearing assembly of claim 5, wherein each of the plurality of gaps exhibits a gap width less than or equal to a distance between the adjacent superhard bearing elements of the plurality of superhard bearing elements.

7. The bearing assembly of claim 1, wherein the bearing assembly is configured as one of a thrust bearing or a radial bearing.

8. The bearing assembly of claim 1, wherein the bearing assembly is configured as one of a rotor or a stator.

9. The bearing assembly of claim 1, wherein the support ring at one of the plurality of reduced-thickness portions exhibits a minimum thickness dimension of about 10% to about 95% of a maximum thickness dimension of the support ring.

10. The bearing assembly of claim 1, wherein the plurality of superhard bearing elements includes a polycrystalline diamond body bonded to a substrate.

11. The bearing assembly of claim 1, wherein the support ring includes a plurality of recesses in the first surface distributed circumferentially about the axis, each of the plurality of superhard bearing elements being disposed and affixed to the support ring partially in one of the plurality of recesses.

12. A bearing assembly, comprising:
   a plurality of superhard bearing elements distributed circumferentially about an axis, each of the plurality of superhard bearing elements including a leading side and a trailing side; and
   a support ring having the plurality of superhard bearing elements mounted thereto, the support ring having a first surface including the superhard bearing elements and a second surface, the support ring further including:
   a plurality of reduced-thickness portions each of which exhibits a reduced-thickness dimension, the reduced-thickness dimension being defined between the second and first surfaces of the support ring, each of the plurality of reduced-thickness portions located proximate to the leading side of a respective one of the plurality of superhard bearing elements, one or more of the plurality of reduced-thickness portions including;
   a recessed surface on the second surface at least partially defined by a reduced thickness proximate to the leading side of the respective one of the plurality of superhard bearing elements that tapers to a greater thickness at a location nearer to the trailing side of one of the plurality of superhard bearing elements; and
   a gap on the second surface positioned between adjacent superhard bearing elements of the plurality of superhard bearing elements.

13. The bearing assembly of claim 12, wherein the recessed surface forms an angle with the second surface of the support ring of more than 0 degrees to about 70 degrees.

14. The bearing assembly of claim 12, wherein the support ring exhibits a minimum thickness in the gap.

15. The bearing assembly of claim 12, wherein the support ring at one of the plurality of reduced-thickness portions exhibits a minimum thickness dimension of about 10% to about 95% of a maximum thickness dimension of the support ring.

16. The bearing assembly of claim 12, wherein the bearing assembly is configured as one of a thrust bearing or a radial bearing.

17. The bearing assembly of claim 12, wherein bearing assembly is configured as one of a rotor or a stator.

18. A bearing apparatus, comprising:
   a rotor;
   a stator; and
   wherein at least one of the rotor or the stator includes:
   a plurality of superhard bearing elements distributed circumferentially about an axis, each of the plurality of superhard bearing elements including a leading side and a trailing side, and
   a support ring including a first surface and a second surface, the first surface of the support ring having the plurality of superhard bearing elements mounted thereto, the support ring including one or more reduced-thickness portions, the reduced-thickness portions being defined between the first and second surfaces of the support ring, each of the one or more reduced-thickness portions located proximate to the leading side of a respective one of the plurality of superhard bearing elements and including a recessed surface having the reduced-thickness dimension proximate to the leading side of one of the plurality of superhard bearing elements that tapers to a greater thickness dimension at a location nearer to the trailing side of the one of the plurality of superhard bearing elements.

19. The bearing apparatus of claim 18, wherein the rotor and the stator are configured as one of a thrust-bearing assembly or a radial bearing assembly.

20. A bearing assembly, comprising: a plurality of superhard bearing elements distributed circumferentially about an axis, each of the plurality of superhard bearing elements including a leading side and a trailing side; and a support ring having the plurality of superhard bearing elements mounted thereto, the support ring including a first surface; a second surface spaced from the first surface; and a plurality of reduced-thickness portions each of which exhibits a reduced-thickness dimension, the reduced-thickness dimension being defined between the first and second surfaces of the support ring, each of the plurality of reduced-thickness portions located proximate to the leading side of a respective one of the plurality of superhard bearing elements and including: a recessed surface having the reduced-thickness dimension proximate to the leading side of the respective one of the plurality of superhard bearing elements; and a gap located on the second surface between the recessed surface and the trailing side of an adjacent of the one of the plurality of superhard bearing elements.

\* \* \* \* \*